United States Patent [19]

Melkonian et al.

[11] Patent Number: 5,316,459
[45] Date of Patent: May 31, 1994

[54] EXTRUSION CALIBRATOR WITH INSERT PLATES

[75] Inventors: George Melkonian, Kent; Michael R. Crippen, Issaquah, both of Wash.

[73] Assignee: Mikron Industries, Kent, Wash.

[21] Appl. No.: 89,276

[22] Filed: Jul. 8, 1993

Related U.S. Application Data

[63] Continuation-in-part of Ser. No. 16,730, Feb. 11, 1993.

[51] Int. Cl.$^5$ .............................................. B29C 47/90
[52] U.S. Cl. ................................ 425/71; 264/177.17; 264/209.4; 264/211.13; 425/72.1; 425/185; 425/192 R; 425/392
[58] Field of Search .................. 425/71, 70, 72.1, 185, 425/190, 192 R, 326.1, 387.1, 388, 392; 264/177.17, 209.4, 211.13

[56] References Cited

U.S. PATENT DOCUMENTS

| | | | |
|---|---|---|---|
| 2,519,375 | 8/1950 | Jargstorff et al. | 264/280 X |
| 3,008,186 | 11/1961 | Voigt | 425/326.1 |
| 3,239,881 | 3/1966 | Larsen | 425/326.1 |
| 3,248,463 | 4/1966 | Wiley et al. | 264/567 |
| 3,538,210 | 11/1970 | Gatto | 264/519 |
| 3,546,745 | 12/1970 | Ball | 425/71 |
| 3,717,426 | 2/1973 | Tucking et al. | 425/71 |
| 3,792,951 | 2/1974 | Meyers | 425/380 X |
| 3,931,379 | 1/1976 | Cruson et al. | 425/71 X |
| 3,932,080 | 1/1976 | Uemura et al. | 425/388 X |
| 4,022,557 | 5/1977 | Johnson | 425/71 |
| 4,088,724 | 5/1978 | Kuhnert | 425/326.1 X |
| 4,110,062 | 8/1978 | Summers | 425/71 |
| 4,113,411 | 9/1978 | Terragni | 425/325 |
| 4,120,926 | 10/1978 | Titz | 264/237 X |
| 4,181,487 | 1/1980 | Kessler | 425/326.1 |
| 4,329,314 | 5/1982 | Jackson et al. | 264/519 |
| 4,383,672 | 5/1983 | Kreuttner | 425/192 R X |
| 4,401,424 | 8/1983 | DeZen | 425/388 |
| 4,468,369 | 8/1984 | Gauchel et al. | 264/560 |
| 4,530,650 | 7/1985 | Milani | 425/71 |
| 4,543,051 | 9/1985 | Maillefer | 425/326.1 X |
| 4,740,146 | 4/1988 | Angelbeck | 425/71 |
| 4,750,873 | 6/1988 | Loe et al. | 264/209.4 X |
| 4,755,118 | 7/1988 | Ondush et al. | 425/71 |
| 4,776,783 | 10/1988 | Pelle et al. | 425/190 |
| 4,913,863 | 4/1990 | Burrafato et al. | 264/177.17 X |
| 4,959,002 | 9/1990 | Pleasant | 425/192 R |
| 5,085,567 | 2/1992 | Neumann | 425/71 |
| 5,116,450 | 5/1992 | Spoo et al. | 425/185 X |

FOREIGN PATENT DOCUMENTS

| | | |
|---|---|---|
| 1184941 | 1/1965 | Fed. Rep. of Germany . |
| 2152060 | 4/1972 | Fed. Rep. of Germany . |
| 1316597 | 5/1963 | France . |
| 2086713 | 12/1971 | France . |
| 2209662 | 7/1974 | France . |
| 45-36020 | 11/1970 | Japan . |
| 1282908 | 7/1972 | United Kingdom . |
| 2015418 | 9/1979 | United Kingdom . |

Primary Examiner—Richard L. Chiesa
Attorney, Agent, or Firm—Seed and Berry

[57] ABSTRACT

An extrusion calibrating apparatus connectable to external sources of cooling water and vacuum, and usable to calibrate the exterior profile of a hollow thermal plastic extrusion. The apparatus includes lower and upper cover plates each having a pair of vacuum manifolds therein, the lower cover plate being fixedly attachable to a stationary support. The apparatus further includes lower and upper vacuum plates each having a plurality of vacuum slots extending between a lower and an upper side thereof and in communication with a corresponding vacuum manifold. Each of the vacuum plates also has supply and return water channels providing communication between spaced-apart interior supply and return ports on an inward side thereof. A heat-conducting calibrating insert is removably positioned within an interior chamber between the vacuum plates with lower and upper sides in face-to-face juxtaposition with corresponding inward sides of the vacuum plates. The insert has a calibrating aperture and a plurality of vacuum slots extending between the lower and upper sides thereof and communicating with the calibrating aperture, and the vacuum slots of the vacuum plates. The vacuum slots are defined by spaced-apart removable pairs of insert plates received in insert plate apertures in the insert. The lower and upper sides of the insert each have a water channel which communicates with a corresponding pair of the vacuum plate supply and return ports.

27 Claims, 11 Drawing Sheets

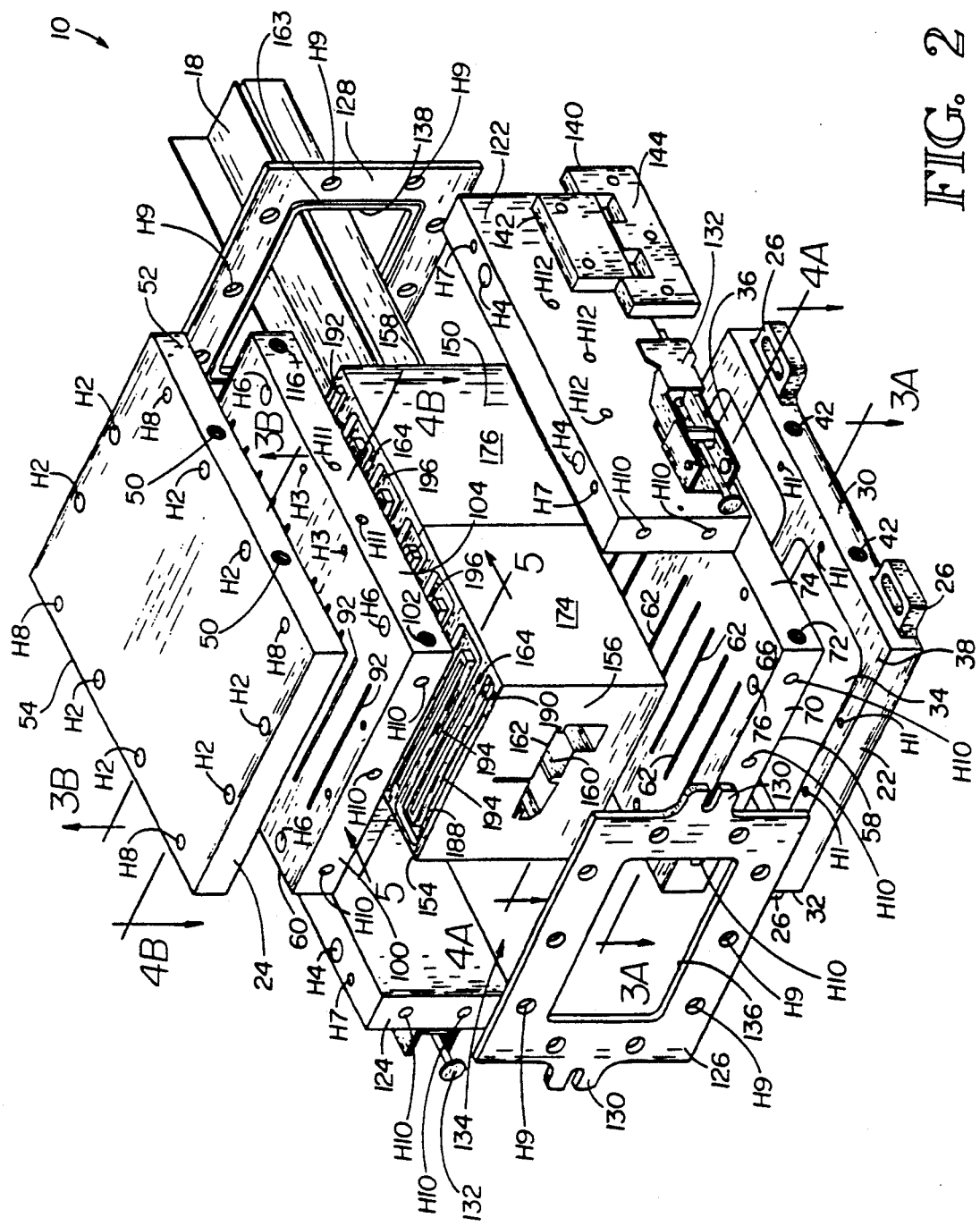

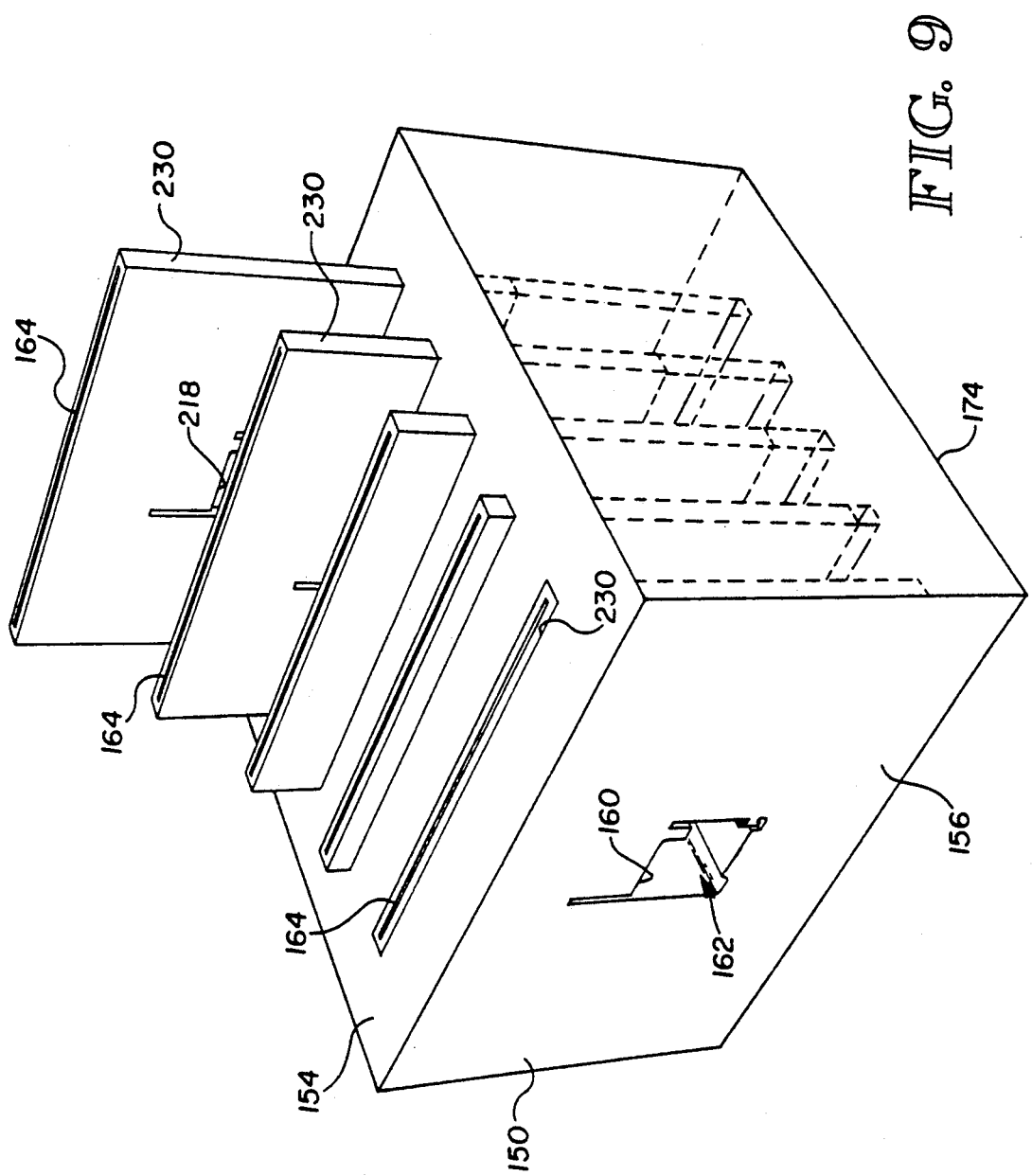

EXTRUSION CALIBRATOR WITH INSERT PLATES

CROSS-REFERENCE TO RELATED APPLICATION

This application is a continuation-in-part of U.S. application Ser. No. 08/016,730, filed Feb. 11, 1993, now pending.

TECHNICAL FIELD

The present invention relates generally to extrusion calibrators, and more particularly, to an extrusion calibrator used to calibrate the exterior profile of a hollow thermoplastic extrusion upon its exit from an extruding die while the extrusion is still in a heated plastic state.

BACKGROUND OF THE INVENTION

In the manufacture of hollow extrusions from a thermoplastic material using a continuous extrusion process, such as plastic window and door component extrusions, the extrusion exits an extruding die while still in a heated thermoplastic state. To produce a properly sized extrusion, it is necessary to calibrate the exterior profile of the hollow extrusion using a calibrator. This assures that the final extrusion has the desired exterior size and shape.

A calibrator is necessary because upon exiting the extruding die the relatively thin walls of the extrusion are soft and cannot support their own weight. Further, upon exit from the extruding die the exterior size of the extrusion sometimes varies from the desired dimension for the finished extrusion. While the extrusion is still in the plastic state, and usually immediately upon exit from the extruding die, the extrusion is passed through one or more calibrators which apply a vacuum to the thin walls of the extrusion to pull them against the interior walls of an elongated calibrating aperture which has the desired size and shape (i.e., the exterior profile) of the finished extrusion. This prevents the relatively thin walls of the extrusion from sagging or otherwise deforming as the extrusion is pulled through the calibrator.

While the vacuum holds the walls of the extrusion in place against the interior walls of the calibrating aperture as the extrusion moves through the calibrator, cooling water is typically passed through channels in the calibrator to conduct heat away from and thereby cool the extrusion until it is sufficiently rigid that it will maintain the desired size and shape of the finished extrusion upon its exit from the calibrator. Since the extrusion takes time to cool and the production through-put requirement is relatively large in most applications, several calibrators must sometimes be used in series so that when the extrusion exits the last calibrator it will have cooled sufficiently to maintain its own size and shape without the support of the vacuum. Eventually, the extrusion reaches a cutter, and the extrusion is cut to the desired length. Such calibrators are shown in various U.S. patents such as, U.S. Pat. Nos. 4,468,369; 4,120,926 and 4,401,424, incorporated herein by reference.

Typically, prior art calibrators have been formed as an integral unit from aluminum or stainless steel, or some other heat conductive material. The heat of the extrusion, while still in the plastic state, is conducted through the metal walls of the calibrator to water circulating through water channels that have been cut in the metal walls. The cooling of the plastic occurs while it is being pulled through the calibrator with its thin walls held in position by the vacuum being applied through a series of vacuum apertures also cut into the metal walls of the calibrator. Hoses are connected to ports in the metal walls to handle the supply and return of the cooling water between the water channels and an external source of water, and to make the connection of the vacuum apertures to an external source of vacuum.

In the past, an entirely new calibrator had to be machined for each specific extrusion profile being produced. As shown in U.S. Pat. Nos. 4,120,926 and 4,468,369, vacuum calibrators have typically been made from several thick metal slabs that have been machined to match the profile of the extrusion being manufactured, to incorporate the water channels for cooling the extrusion, and to incorporate the vacuum apertures which apply the vacuum to the extrusion walls as they pass by the vacuum apertures. The slabs are individually machined and then assembled to form the calibrator. If it was desired to change the profile slightly, or it was desired to produce a new profile using the same production line equipment, it was necessary to machine a completely new calibrator, remove the old one from the production line, and replace it with the new calibrator. When replacing an existing calibrator in the production line with a new calibrator, the production line had to be closed down for a substantial period of time until the new calibrator could be put in position and aligned with the extrusion die, and the vacuum and water supplies reconnected to the new calibrator. This is an expensive, time consuming process. Further, the machining of the extrusion profile and the water channels and vacuum apertures into the metal slabs took time and was quite expensive. The same problems were encountered when it was necessary to replace a calibrator which has been worn to the point of providing insufficient tolerance for the extrusion, or to remove the calibrator for cleaning.

An alternative prior art calibrator design is shown in U.S. Pat. No. 4,401,424. This calibrator includes a plurality of pairs of upper and lower sizing elements, with each pair of sizing elements being shaped to define therebetween a longitudinal portion of the calibrating aperture. The pairs of sizing elements are disposed end to end so that together they define the entire calibrating aperture through which the heated extrusion passes. Upper and lower backing members are disposed, respectively, above and below the pairs of sizing elements and extend over the entire length of the calibrator. The upper and lower backing members are releasably secured together with the pairs of upper and lower sizing elements positioned therebetween to clamp the sizing elements in place to define the calibrating aperture. Each of the sizing elements has a vacuum chamber or manifold formed therewithin and slits and bore holes which communicate vacuum from the vacuum manifold to the extrusion as it passes through the calibrating aperture. The vacuum is supplied from an external source of vacuum. Each of the sizing elements also has a cooling water chamber formed therein which is connected to an external source of cooling water. Vacuum and water hoses are connected directly to each of the upper and lower sizing elements of each of the pairs of sizing elements which together form the calibrator.

SUMMARY OF THE INVENTION

The present invention resides in an extrusion calibrating apparatus for use on a stationary support and connectable to an external source of cooling water and an external source of vacuum. The apparatus is usable to calibrate the exterior profile of a hollow extrusion upon its exit from an extruding die while the extrusion is still in a heated plastic state.

The apparatus includes a chamber having lower and upper assemblies. The lower assembly has a lower vacuum manifold and a lower vacuum channel providing communication between the lower vacuum manifold and the source of vacuum. The lower assembly further has a plurality of vacuum apertures extending between the lower vacuum manifold and openings in an upper side of the lower assembly. The lower assembly has supply and return lower water channels providing communication between spaced-apart interior supply and return ports in the upper side of the lower assembly and the source of water.

The upper assembly similarly has an upper vacuum manifold and an upper vacuum channel providing communication between the upper vacuum manifold and the source of vacuum. The upper assembly further has a plurality of vacuum apertures extending between the upper vacuum manifold and openings in a lower side of the upper assembly. The upper assembly has supply and return upper water channel providing communication between spaced-apart interior supply and return ports in the lower side of the upper assembly and the source of water. One of the lower or upper assemblies has attachment members fixedly attachable to the stationary support. At least a portion of the lower or upper assembly is movable relative to the other to define an access opening to the chamber.

The apparatus further includes a heat-conducting calibrating insert sized to pass through the access opening and be removably positioned within the chamber between the lower and upper assemblies with a lower side in face-to-face juxtaposition with the upper side of the lower assembly and an upper side in face-to-face juxtaposition with the lower side of the upper assembly.

The insert has a calibrating aperture corresponding to the exterior profile of the extrusion extending lengthwise therethrough. The calibrating aperture has an entry opening to permit the entry of the extrusion into the calibrating aperture and an exit opening to permit the exit of the extrusion out of the calibrating aperture. The insert has a plurality of vacuum member receiving apertures extending between the insert lower and upper sides, and intersecting with the insert calibrating aperture. The vacuum member has a plurality of lower vacuum apertures extending between the lower side of the insert and a calibrating aperture of the vacuum member with the lower vacuum apertures having openings in communication with the openings in the upper side of the lower assembly. The vacuum member further has a plurality of upper vacuum apertures extending between the upper side of the insert and the calibrating aperture of the vacuum member with the upper vacuum apertures having openings in communication with the openings in the lower side of the upper assembly.

Further, the insert has a lower water channel formed therein toward the lower side thereof and extending to communicate between the spaced-apart supply and return ports in the upper side of the lower assembly. The insert also includes an upper water channel formed therein toward the upper side thereof and extending to communicate between the spaced-apart supply and return ports in the lower side of the upper assembly.

In the illustrated embodiment of the invention, the lower assembly includes a lower cover plate having the lower vacuum manifold formed on an upper side thereof. The lower assembly also includes a lower vacuum plate having a plurality of vacuum plate apertures extending between a lower and an upper side thereof with the vacuum plate apertures having openings in the upper side of the lower vacuum plate. The supply and return lower water channels are formed in the lower vacuum plate. The lower side of the lower vacuum plate is in face-to-face juxtaposition with the upper side of the lower cover plate.

Similarly, the upper assembly includes an upper cover plate having the upper vacuum manifold formed on a lower side thereof. The upper assembly also includes an upper vacuum plate having a plurality of vacuum plate apertures extending between a lower and an upper side thereof with the vacuum plate apertures having openings in the lower side of the upper vacuum plate. The supply and return upper water channels are formed in the upper vacuum plate. The upper side of the upper vacuum plate is in face-to-face juxtaposition with the lower side of the upper cover plate.

In the illustrated embodiment, the apparatus further includes right and left sidewalls, and front and rear cover plates. The front and rear cover plates in combination with the lower and upper vacuum plates and the right and left sidewalls, define the chamber. The front cover plate has an aperture sized to allow the extrusion to pass unobstructed therethrough on its entry into the chamber and the rear cover plate has an aperture sized to allow the extrusion to pass unobstructed therethrough on its exit from the chamber. The upper cover plate and upper vacuum plate are selectively movable to an open position to provide the access opening to the chamber, while the lower cover plate remains fixedly attached to the stationary support with the lower vacuum plate, right and left sidewalls and front and rear cover plates assembled and attached thereto. This permits the removal of the insert from the chamber through the access opening while the apparatus remains connected to the sources of water and vacuum and aligned with the extruding die. The insert or a replacement therefor can be repositioned within the chamber through the access opening and the upper cover plate and upper vacuum plate moved into a closed position.

In the illustrated embodiment, a hinge is connected between one of the upper cover plate or upper vacuum plate and one of the left or right sidewalls, and the upper cover plate and upper vacuum plate are fixedly attached together.

In the illustrated embodiment, the vacuum member comprises a pair of plates fabricated from a material having a greater wear resistance than the insert. Each of said pairs of plates has a forward plate and a rearward plate with a calibrating aperture corresponding to the insert calibrating aperture, and being removably positioned within one of said vacuum member receiving apertures with the plate calibrating apertures in alignment with the insert calibrating aperture. The forward and rearward plates of each of said pairs of plates is held in spaced-apart positions within one of the vacuum member receiving apertures to define therebetween a lower vacuum aperture extending between the insert lower side and the plate calibrating apertures with the lower vacuum aperture having an opening at the insert lower side in communication with at least one of the openings in the upper side of the lower assembly, and an upper vacuum aperture extending between the insert upper side and the plate calibrating apertures with the upper vacuum aperture having an opening at the insert upper side in communication with at least one of the openings in the lower side of the upper assembly. The vacuum member receiving apertures extend transverse to the lengthwise direction of the calibrating aperture. The vacuum member receiving apertures are arranged in spaced-apart positions along the length of the calibrating aperture in positions corresponding to the positions of the vacuum plate slots. Each of the slots in the lower and upper vacuum plates is positioned to communicate vacuum with a corresponding one of the lower and upper vacuum apertures of the pairs of plates.

Each of the lower and upper water channels of the insert is formed by a plurality of interconnecting lengthwise portions. Each lengthwise portion is positioned spaced-apart from and generally aligned with at least one of the vacuum member receiving apertures.

The right and left sidewalls are positioned and extend between the upper side of the lower vacuum plate and the lower side of the upper vacuum plate. The lower and upper vacuum plates each have a perimeter edgewall with exterior supply and return water ports therein in communication with the corresponding ones of the supply and return water channels. The exterior supply and return water ports are connectable to the source of water. The lower and upper cover plates each have a perimeter edgewall with an exterior vacuum port therein in communication with the corresponding one of the lower or upper vacuum channel. The exterior vacuum port is connectable to the source of vacuum.

In the illustrated embodiment, the insert is formed by separable forward and rearward insert portions.

Other features and advantages of the invention will become apparent from the following detailed description, taken in conjunction with the accompanying drawings.

BRIEF DESCRIPTION OF THE DRAWINGS

FIG. 2 is a reduced scale exploded view of the extrusion calibrator of FIG. 1.

FIG. 9 is a front isometric view of an alternative design for an insert used with the extrusion calibrator of FIG. 1.

DETAILED DESCRIPTION OF THE PREFERRED EMBODIMENTS

Figure 1:
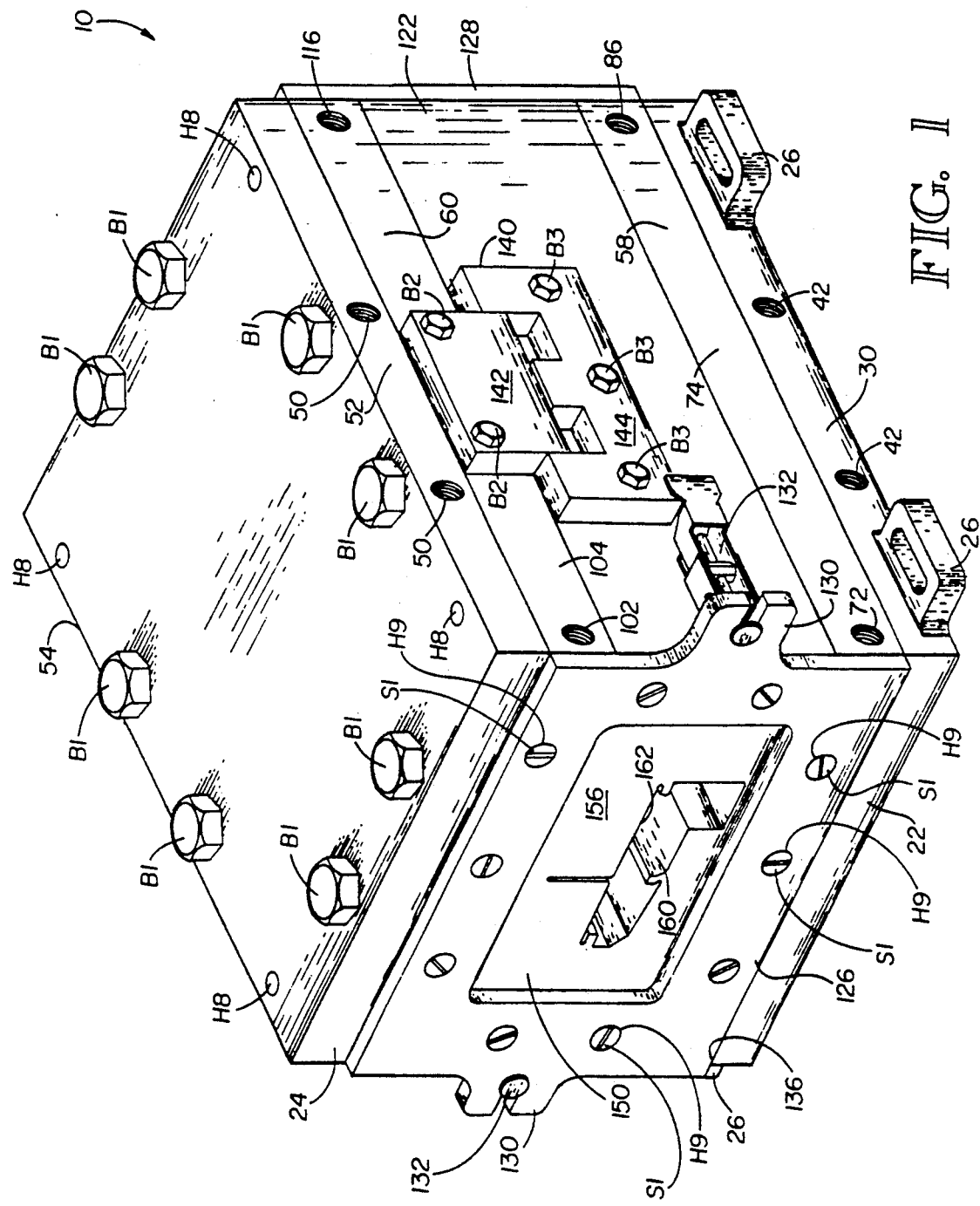
FIG. 1 is a front isometric view of an extrusion calibrator embodying the present invention.
Figure 1A:
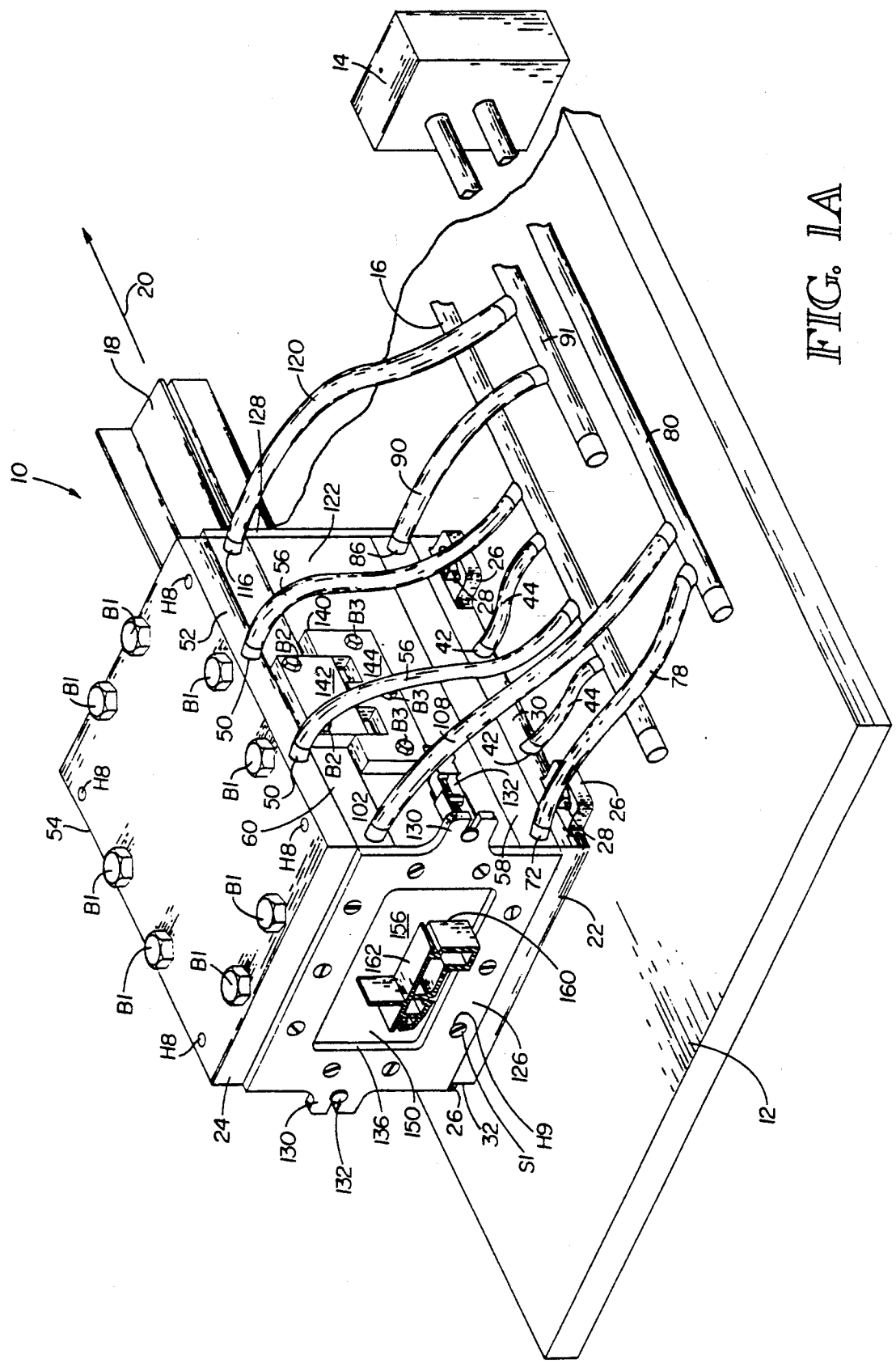
FIG. 1A is a reduced-scale front isometric view of the extrusion calibrator of FIG. 1 shown in use connected to external sources of cooling water and vacuum.

As shown in the drawings for purposes of illustration, the present invention is embodied in an extrusion calibrator, indicated generally by the reference 10. The calibrator 10 is shown in FIG. 1 fully assembled and in FIG. 2 in exploded view. In FIG. 1A, the calibrator 10 is shown in use fixedly attached to a stationary support surface 12 and connected to an external source of cooling water 14 and an external source of vacuum 16. A continuous length of hollow extrusion 18 made of thermoplastic material is shown being pulled through the calibrator 10 in the direction indicated by arrow 20 immediately upon its exit from an extruding die (not shown) while in a heated plastic state.

Figure 3A:
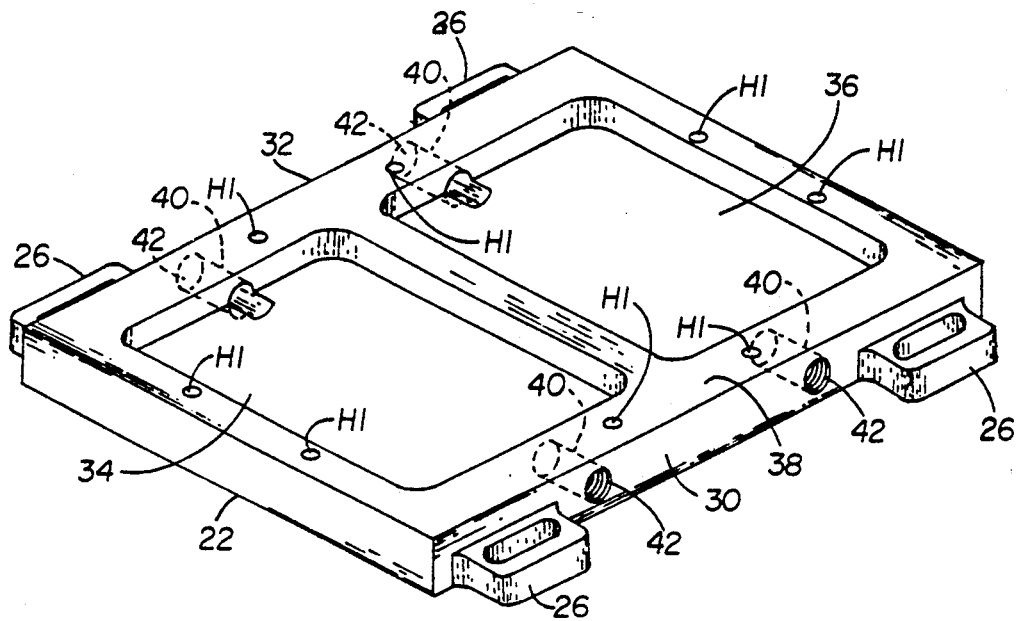
FIG. 3A is a reduced scale, top perspective view of a lower cover plate used in the extrusion calibrator of FIG. 1 viewed from the direction indicated by the arrows 3A of FIG. 2.
Figure 3B:
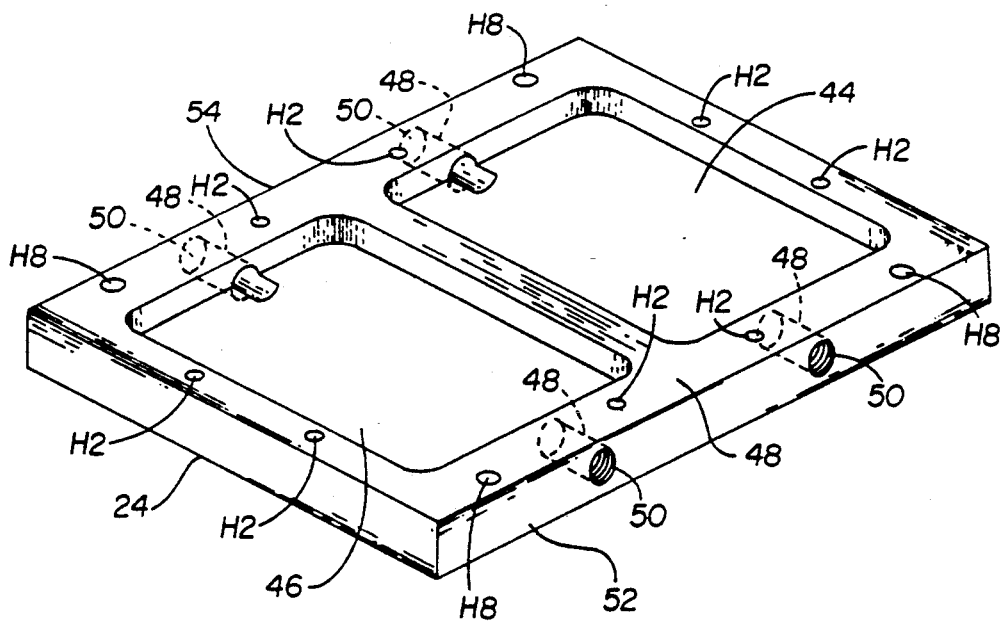
FIG. 3B is a reduced scale, bottom perspective view of an upper cover plate used in the extrusion calibrator of FIG. 1 viewed from the direction indicated by the arrows 3B of FIG. 2.

The calibrator 10 includes a lower cover plate 22 and an upper cover plate 24, shown separate from the calibrator in FIGS. 3A and 3B, respectively. The lower cover plate 22 includes four lugs 26 by which the lower cover plate is fixedly attached to the stationary support 12 by bolts 28, as shown in FIG. 1A. Two of the lugs 26 are attached to and project laterally outward from a left edgewall 30 of the lower cover plate 22, and the other two lugs are attached to and project laterally outward from a right edgewall 32 of the lower cover plate.

The lower cover plate 22 has an upwardly opening forward vacuum manifold 34 and an upwardly opening rearward vacuum manifold 36 formed in an upper side 38 thereof. Four vacuum channels 40 are provided to communicate vacuum with the forward and rearward vacuum manifolds 34 and 36. The vacuum channels 40 each terminate at one end in a threaded port 42. Two of the vacuum channels 40 have the port 42 positioned at the left edgewall 30 of the lower cover plate 22, and the other two of the vacuum channels have the port 42 positioned at the right edgewall 32 of the lower cover plate. The two forwardmost of the vacuum channels 40 communicate with the forward vacuum manifold 34, and the two rearwardmost vacuum channels communicate with the rearward vacuum manifold 36. As shown in FIG. 1A, when the calibrator 10 is connected for operation, the ports 42 of the vacuum channels 40 are each connected by a hose 44 (only the left-side hoses being shown) to the external vacuum source 16.

As shown in FIG. 3B, the upper cover plate 24 is very similar in construction. Although shown in reverse orientation in the bottom perspective view of FIG. 3B, the upper cover plate 24 has a downwardly opening forward vacuum manifold 44 and a downwardly opening rearward vacuum manifold 46 formed in a lower side 48 thereof. As with the lower cover plate 22, the upper cover plate 24 has four vacuum channels 48 to communicate with the forward and rearward vacuum manifolds 44 and 46, each vacuum channel terminating in a threaded port 50. Two of the vacuum channels 48 have the port 50 positioned at a left edgewall 52 of the upper cover plate 24, and the other two of the vacuum channels have the port 50 positioned at a right edgewall 54 of the upper cover plate. The two forwardmost of the vacuum channels 48 communicate with the forward vacuum manifold 44, and the two rearwardmost vacuum channels communicate with the rearward vacuum manifold 46. As shown in FIG. 1A, the ports 50 of the vacuum channels 48 are each connected by a hose 56 (only the left-side hoses being shown) to the external vacuum source 16.

Figure 4A:
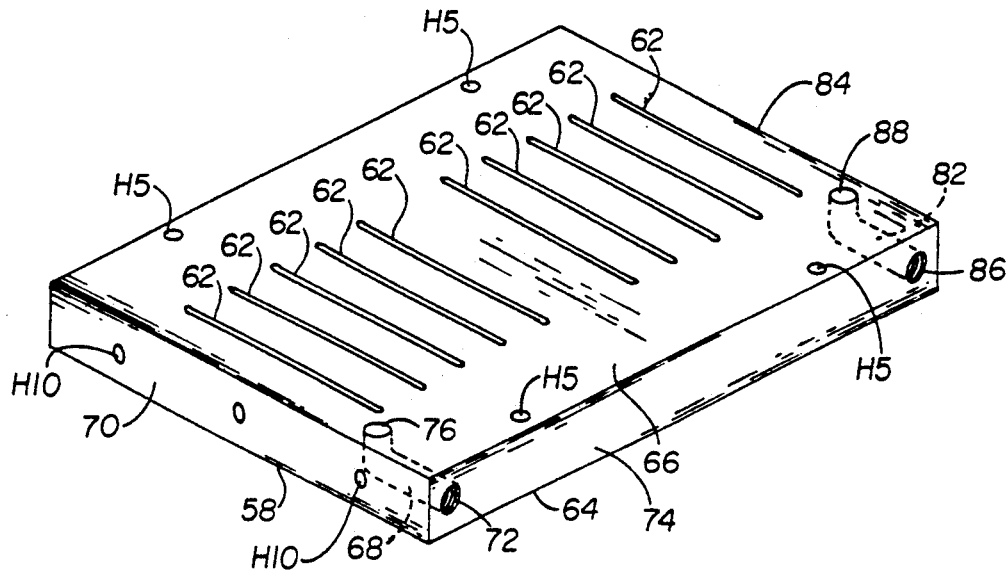
FIG. 4A is a reduced scale, top perspective view of a lower vacuum plate used in the extrusion calibrator of FIG. 1 viewed from the direction indicated by arrows 4A of FIG. 2.
Figure 4B:
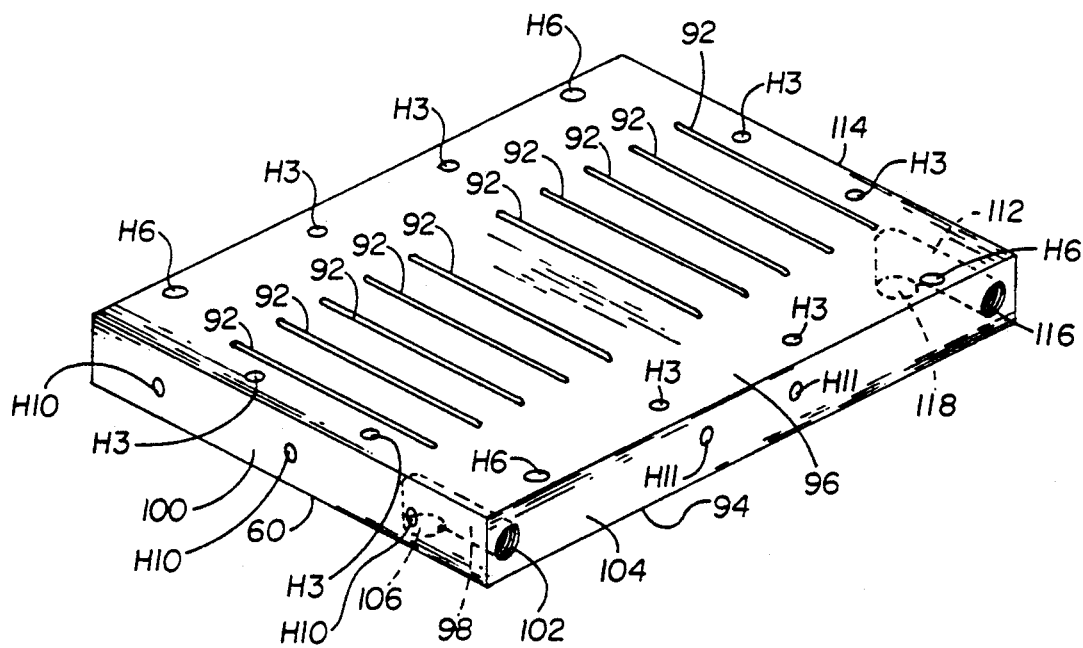
FIG. 4B is a reduced scale, top perspective view of an upper vacuum plate used in the extrusion calibrator of FIG. 1 viewed from the direction indicated by arrows 4B of FIG. 2.

The calibrator 10 further includes a lower vacuum plate 58 and an upper vacuum plate 60, shown separate from the calibrator in FIGS. 4A and 4B, respectively. The lower vacuum plate 58 has ten vacuum slots 62 extending fully therethrough between a lower side 64 and an upper side 66 thereof. The five forwardmost slots 62 terminate in openings in the lower side 64 of the lower vacuum plate 58 positioned to be in communication with the forward vacuum manifold 34 of the lower cover plate 22 when the calibrator 10 is assembled. Similarly, the five rearwardmost slots 62 terminate in openings in the lower side 64 of the lower vacuum plate 58 positioned to be in communication with the rearward vacuum chamber 36 of the lower cover plate 22. All ten of the slots 62 terminate in openings in the upper side 66 of the lower vacuum plate 58. Each of the slots 62 extends transverse to the direction of movement of the extrusion 18 indicated by arrow 20 in FIG. 1A as it passes through the calibrator 10. The slots 62 have a transverse length at least as long as the width of the extrusion 18.

The lower vacuum plate 58 further includes a supply lower water channel 68 positioned toward a forward end 70 of the lower vacuum plate and extending between a threaded port 72 in a left edgewall 74 of the lower vacuum plate, and a port 76 formed in the upper side 66 of the lower vacuum plate. As shown in FIG. 1A, when the calibrator 10 is connected for operation, the port 76 of the supply lower channel 68 is connected by a hose 78 to a supply water conduit 80 which supplies pressurized cooling water from the external water source 14.

The lower vacuum plate 58 also has a return lower water channel 82 positioned toward a rearward end 84 of the lower vacuum plate and extending between a threaded port 86 in the left edgewall 74 of the lower vacuum plate, and a port 88 formed in the upper side 66 of the lower vacuum plate. As shown in FIG. 1A, the port 86 of the return lower channel 82 is connected by a hose 90 to a return water conduit 91 which returns water to the external water source 14.

When the calibrator 10 is assembled for operation, the lower side 64 of the lower vacuum plate 58 is in face-to-face juxtaposition with the upper side 38 of the lower cover plate 22. The lower cover plate 22 and the lower vacuum plate 58 are fixedly attached together by eight bolts (not shown) which project upward through smooth bore fastening holes H1 (shown in FIG. 3A) in the lower cover plate and are threadedly received in correspondingly positioned threaded fastening holes (not shown) in the lower side 64 of the lower vacuum plate.

As shown in FIG. 4B, the upper vacuum plate 60 has a very similar construction with the lower vacuum plate 58. The upper vacuum plate 60 has ten vacuum slots 92 extending fully therethrough between a lower side 94 and an upper side 96 thereof. The five forwardmost slots 92 terminate in openings in the lower side 94 of the upper vacuum plate 60 positioned to be in communication with the forward vacuum manifold 44 of the upper cover plate 24 when the calibrator 10 is assembled. Similarly, the five rearwardmost slots 92 terminate in openings in the lower side 94 of the upper vacuum plate 60 positioned to be in communication with the rearward vacuum chamber 46 of the upper cover plate 24. All ten of the slots 92 terminate in openings in the upper side 96 of the upper vacuum plate 60. Each of the slots 92 extends transverse to the direction of movement of the extrusion 18 indicated b arrow 20 in FIG. 1A as it passes through the calibrator 10. The slots 92 have a transverse length at least as long as the width of the extrusion 18.

The upper vacuum plate 60 further includes a supply upper water channel 98 positioned toward a forward end 100 of the upper vacuum plate and extending between a threaded port 102 in a left edgewall 104 of the upper vacuum plate, and a port 106 formed in the lower side 94 of the upper vacuum plate. As shown in FIG. 1A, when the calibrator 10 is connected for operation, the port 102 of the supply upper channel 98 is connected by a hose 108 to the supply water conduit 80 which supplies pressurized cooling water from the external water source 14.

The upper vacuum plate 60 also has a return upper water channel 112 positioned toward a rearward end 114 of the upper vacuum plate and extending between a threaded port 116 in the left edgewall 104 of the upper vacuum plate, and a port 118 formed in the lower side 94 of the upper vacuum plate. As shown in FIG. 1A, the port 116 of the return upper channel 112 is connected by a hose 120 to the return water conduit 91 which returns water to the external water source 14.

When the calibrator 10 is assembled for operation, the upper side 96 of the upper vacuum plate 60 is in face-to-face juxtaposition with the lower side 48 of the upper cover plate 24. The upper cover plate 24 and the upper vacuum plate 60 are fixedly attached together by eight bolts B1 (shown in FIGS. 1 and 1A) which project downward through smooth bore fastening holes H2 (shown in FIG. 3B) in the upper cover plate and are threadedly received in correspondingly positioned threaded fastening holes H3 (shown in FIG. 4B) in the upper side 96 of the upper vacuum plate.

The calibrator 10 has a left sidewall 122 and a right sidewall 124, best illustrated in FIG. 2. The left and right sidewalls 122 and 124 are positioned and extend between the upper side 66 of the lower vacuum plate 58 and the lower side 94 of the upper vacuum plate 60 when the calibrator 10 is assembled. The left and right sidewalls 122 and 124 are spaced apart, each positioned adjacent to a corresponding one of the left and right edges of the lower and upper vacuum plates 58 and 60.

The left and right sidewalls 122 and 124 are fixedly attached to the lower vacuum plate 58 by four bolts (not shown) which project downward through smooth bore fastening holes H4 (shown in FIG. 2) in the left and right sidewalls and are threadably received in correspondingly positioned threaded fastening holes H5

(shown in FIG. 4A) in the upper side 66 of the lower vacuum plate 58. The upper cover plate 24 and the upper vacuum plate 60 are removably attached as a unit to the left and right sidewalls 122 and 124 by four bolts (not shown) which project downward through smooth bore fastening holes H6 (shown in FIG. 4B) in the upper vacuum plate 60 and are threadedly received in correspondingly positioned threaded fastening holes H7 (shown in FIG. 2) in the left and right sidewalls. The upper cover plate 24 is provided with four correspondingly positioned access holes H8 which permit access to the bolts received in the holes H6 and H7 described above. The upper cover plate 24 and the upper vacuum plate 60 are selectively and easily removable as a unit primarily by loosening the four bolts attaching them to the left and right sidewalls 122 and 124, without dismantling the other components of the calibrator 10, for reasons which will be described below.

As shown in FIG. 1, 1A and 2, the calibrator 10 also includes a front cover plate 126 and a rear cover plate 128. The front cover plate 126 has a pair of slotted attachment members 130, each projecting laterally outward for grasping by a correspondingly positioned one of two cinch clamps 132 attached to the left and right sidewalls 122 and 124 which selectively apply a rearward force on the front cover plate for reasons which will be described below.

The front and rear cover plates 126 and 128 each have ten fastening holes H9, and the forward and rearward edgewalls of the lower and upper vacuum plates 58 and 60 and the left and right sidewalls 122 and 124 have correspondingly positioned threaded fastening holes H10 (shown in FIG. 2) to receive screws S1 (shown in FIGS. 1 and 1A). The uppermost positioned three of the screws S1 which hold the front cover plate 126 to the upper vacuum plate 58, and the uppermost positioned three of the screws S1 which hold the rear cover plate 128 to the upper vacuum plate are removed when it is desired to remove the upper cover plate 24 and the upper vacuum plate 60 as a unit.

The front and rear cover plates 126 and 128, in combination with the lower and upper vacuum plates 58 and 60 and the left and right sidewalls 122 and 124, define an interior chamber 134 therebetween. The front cover plate 126 has a central aperture 136 sized to allow the extrusion 18 to pass unobstructed therethrough on its entry into the interior chamber. Similarly, the rear cover plate has a central aperture 138 sized to allow the extrusion 18 to pass unobstructed therethrough on its exit from the interior chamber 134.

As previously noted, the upper cover plate 24 and the upper vacuum plate 60 are fixedly attached together and removable as a unit upon the removal of the four bolts attaching them to the left and right sidewalls 122 and 124, and removal of the uppermost six screws S1 for the front and rear cover plates 126 and 128. A hinge 140 permits the upper cover plate 24 and the upper vacuum plates 60 to be rotated as a unit relative to the other components of the calibrator 10 between a close position which closes the interior chamber 134 (as shown in FIGS. 1 and 1A), and an open position which provides an upper access opening to the interior chamber. The hinge 140 has an upper hinge member 142 fixedly attached to the left edgewall 104 of the upper vacuum plate 60 by a pair of bolts B2 which are threadedly received in threaded fastening holes H11 (shown in FIG. 2) in the left edgewall 104 of the upper vacuum plate 60. The hinge 140 further includes a lower hinge member 144 which is fixedly attached to the left sidewall 122 by three bolts B3 which are threadedly received in threaded fastening holes H12 (shown in FIG. 2) in the left sidewall 122. A hinge pin (not shown) pivotally connects the upper hinge member 142 to the lower hinge member 144.

The calibrator 10 includes a removable heat-conducting calibrating insert 150 sized to pass through the access opening formed when the upper cover plate 24 and the upper vacuum plate 60 are rotated into the open position. The calibrating insert 150 is removably positioned within the interior chamber 134 with a lower side 152 thereof in face-to-face juxtaposition with the upper side 66 of the lower vacuum plate 58, and an upper side 154 in face-to-face juxtaposition with the lower side 94 of the upper vacuum plate 60. The insert 150 has a forward face 156 and a rearward face 158 with a calibrating aperture 160 corresponding to the exterior profile of the extrusion 18 extending lengthwise through the insert 150 between its forward and rearward faces 156 and 158. The calibrating aperture 160 has a forward opening 162 in the insert forward face 156 aligned with the central aperture 136 of the front cover plate 126 to permit the unobstructed entry of the extrusion 18 into the forward opening 162 of the calibrating aperture 160. Similarly, the calibrating aperture 160 has a rearward opening (not shown) in the insert rearward face 158 aligned with the central aperture 138 of the rear cover plate 128 to permit the unobstructed exit of the extrusion 18 out of the rearward opening of the calibrating aperture.

As illustrated for only the rear cover plate 128 in FIG. 2, each of the inward sides of the front and rear cover plates 126 and 128 carries an O-ring seal 163 in a groove which extends about the central apertures 136 and 138 thereof. The O-ring seals 163 provide a seal between the front and rear cover plates 126 and 128 and the insert forward and rearward faces 156 and 158 to prevent cooling water from passing therebetween and entering the calibrating aperture 160 through the forward calibrating aperture opening 162 or the rearward calibrating aperture opening. A tight seal is achieved by the closing of the cinch clamps 132 which tends to draw the front cover plate 126 toward the rear cover plate 128 with the insert 150 clamped therebetween.

Figure 5:
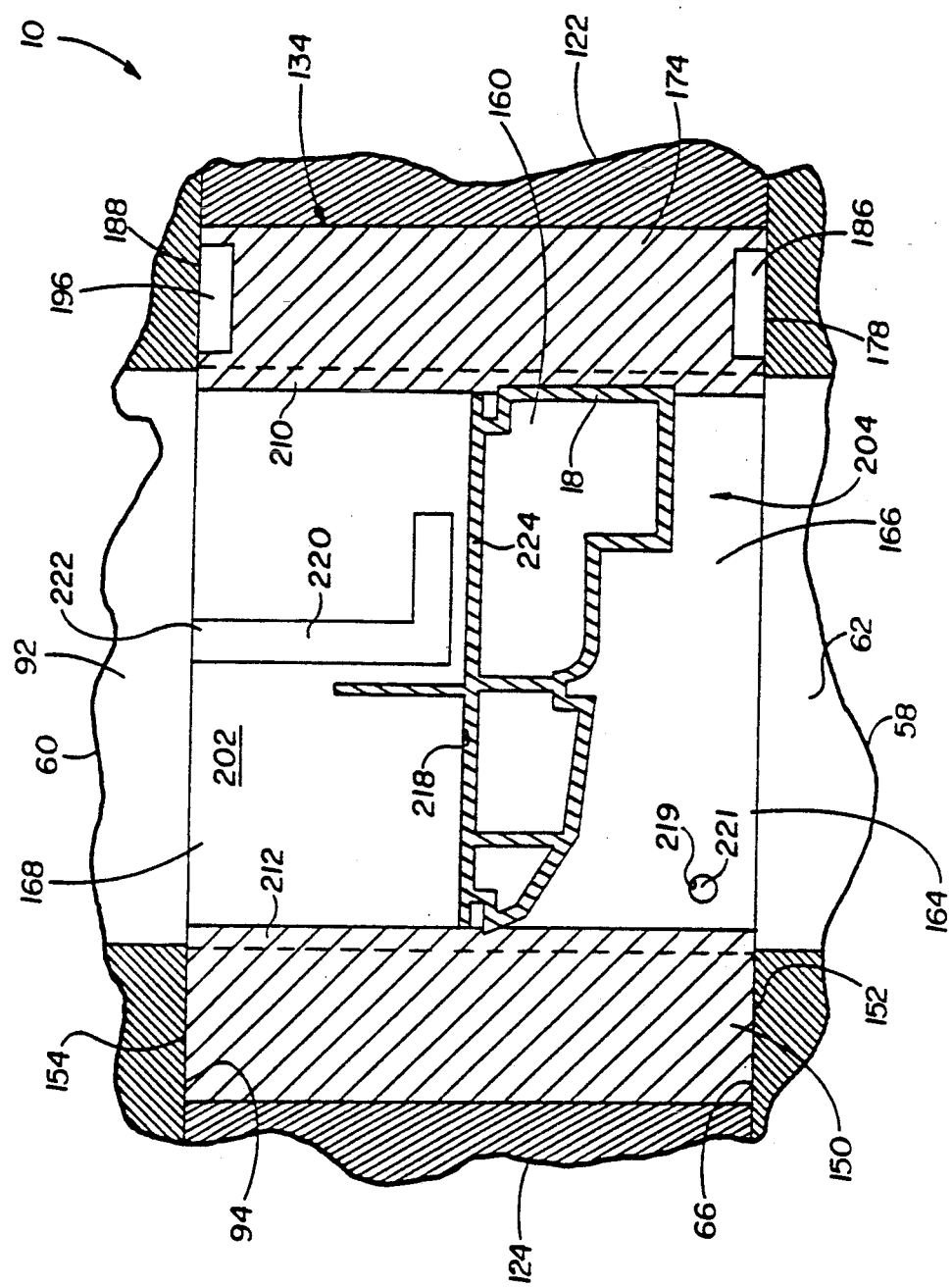
FIG. 5 is an enlarged, fragmentary cross-sectional view of the extrusion calibrator taken substantially along the line 5—5 of FIG. 6A of the insert illustrated as it would appear if installed in the calibrator housing to show the forward face of the rearward insert plate.

As shown in FIGS. 2 and 5, the insert 150 also includes a plurality of slots 164, each extending between the lower side 152 and the upper side 154 thereof. The insert slots 164 are positioned to intersect with the calibrating aperture 160 to communicate vacuum to the thin walls of the extrusion 18 as it passes therethrough. The insert slots 164 each include a lower vacuum slot portion 166 that extend between the lower side 152 of the insert 150 and the calibrating aperture 160, and an upper vacuum slot portion 168 extending between the upper side 154 of the insert and the calibrating aperture.

Each of the insert slots 164 extends transverse to the lengthwise direction of the calibrating aperture 160 and the direction of movement of the extrusion 18 indicated by arrow 20 in FIG. 1A as it passes through the calibrator 10. The insert slots 164 are arranged and spaced apart positioned along nearly the full length of the calibrating aperture 160 between the front and rear faces 156 and 158 of the insert 150. The lower vacuum slot portions 166 for the insert slots 164 terminate at the lower side 152 of the insert 150 at a location so that when the insert 150 is positioned within the chamber 134, the lower vacuum slot portion is in alignment and communication with the opening of a correspondingly positioned one of the vacuum slots 62 in the upper side 66 of the lower vacuum plate 58. Similarly, the upper vacuum slot portion 168 for the insert slots 164 terminate at the upper side 154 of the insert 150 at a location so that when the insert 150 is positioned within the chamber 134, the upper vacuum slot portion is in alignment and communication with the opening of a correspondingly positioned one of the vacuum slots 92 in the lower side 94 of the upper vacuum plate 60.

In the embodiment of the insert 150 illustrated in FIG. 2, the insert includes separable forward and rearward insert portions 174 and 176. In addition to the forward face 156, the forward insert portion 174 includes a rearward face (not shown) and in addition to the rearward face 158 of the insert, the rearward insert portion 176 includes a forward face (not shown) with the rearward face of the forward insert portion and the forward face of the rearward insert portion being in face-to-face juxtaposition. Likewise, the calibrating aperture 160 as a forward portion formed within the forward insert portion 174 and inwardly terminating at the rearward face thereof, and a rearward portion formed within the rearward insert portion 176 and inwardly terminating at the forward face thereof. An O-ring seal (not shown) is positioned between the rearward face of the front insert portion 174 and the forward face of the rear insert portion 176 to prevent cooling water from passing therebetween and entering the calibrating aperture.

Five of the slots 164 are formed in the forward insert portion 174 with lower and upper vacuum slot portions 166 and 168 which align with the openings of the five forwardmost slots 62 of the upper side 66 of the lower vacuum plate 58, and the openings of the five forwardmost slots 92 in the lower side 94 of the upper vacuum plate 60. Similarly, five of the slots 164 are formed in the rearward insert portion 176 with lower and upper vacuum slot portions 166 and 168 which align with the openings of the five rearwardmost slots 62 of the upper side 66 of the lower vacuum plate 58, and the openings of the five rearwardmost slots 92 in the lower side 94 of the upper vacuum plate 60.

Vacuum from the forward and rearward vacuum manifolds 34 and 36 of the lower cover plate 22, and the forward and rearward vacuum manifolds 44 and 46 of the upper cover plate 24 are communicated through the slots 62 and 92 of the lower and upper vacuum plates 58 and 60 to the lower and upper vacuum slot portions 166 and 168 of the insert 150 with which aligned. The vacuum is communicated from the lower and upper vacuum slot portions 166 and 168 to the thin walls of the extrusion 18 as it is pulled through the calibrating aperture 160. The vacuum pulls the thin walls of the extrusion 18 against the interior walls of the calibrating aperture 160 as it transfers its heat to the insert 150 to produce the desired size and shape (i.e., the exterior profile) of the finished extrusion by the time the extrusion exits from the rearward opening of the calibrating aperture.

Since the insert 150 is fabricated from aluminum to provide good thermal conductivity, the frictional engagement of the extrusion 18 against the interior walls of the calibrating aperture 160 as the extrusion is pulled therethrough causes wear on the interior walls. The greater potential for wear is in the vicinity of where the insert slots 164 intersect with the calibrating aperture 160 and the vacuum applied pulls the walls of the extrusion 18 most tightly against the interior walls of the calibrating aperture. To reduce the wear problem while still allowing the insert 150 to be fabricated from a somewhat soft, but good, thermally conductive material such as aluminum, and as can best be seen in FIGS. 6A and 6B, each of the insert slots 164 is formed by a pair of forward and rearward insert plates 200 and 202, respectively, fabricated of stainless steel. The insert plates 200 and 202 are held in parallel spaced-apart relation to define the desired size slot therebetween.

The pair of insert plates 200 and 202, when in position within an insert plate aperture 204 in the insert 150, extends transverse to the lengthwise direction of the calibrating aperture 160 and the direction of movement of the extrusion 18 indicated by arrow 20 in FIG. 1A as it passes through the calibrator 10, and extends fully between the lower and upper sides 152 and 154 of the insert 150. One insert plate aperture 204 is provided for each pair of insert plates 200 and 202, and hence for each insert slot 164. The insert plate aperture 204 extends between the lower and upper sides 152 and 154 of the insert 150 and has open lower and upper ends through which the pair of insert plates 200 and 202 may pass for installation and removal from the insert. Each insert plate aperture 204 is defined by a forward face 206 and a rearward face 208. A forward face of the forward insert plate 200 is in face-to-face juxtaposition with and contacts the forward face 206, and the rear face of the rearward insert plate 202 is in face-to-face juxtaposition with and contacts the rearward face 208 when the pair of insert plates 200 and 202 are within the insert plate aperture 204.

Left and right spacers 210 and 212, respectively, are located at the left and right sides, respectively, of each insert plate aperture 204 midway between the forward and rearward faces 206 and 208 thereof, to engage the left and right edge portions of the pair of insert plates 200 and 202 and thereby hold them at the desired spaced-apart distance to define the insert slot 164. The spacers 210 and 212 extend between the lower and upper sides 152 and 154 of the insert 150. The spacers 210 and 212 have a thickness in the direction between the pair of insert plates 200 and 202 to both define the size of the insert slot 164 to which vacuum is applied for communication with the extrusion 18, and to snugly hold the pair of insert plates 200 and 202 within the insert plate aperture 204 with limited forward and rearward movement permitted.

Figure 5A:
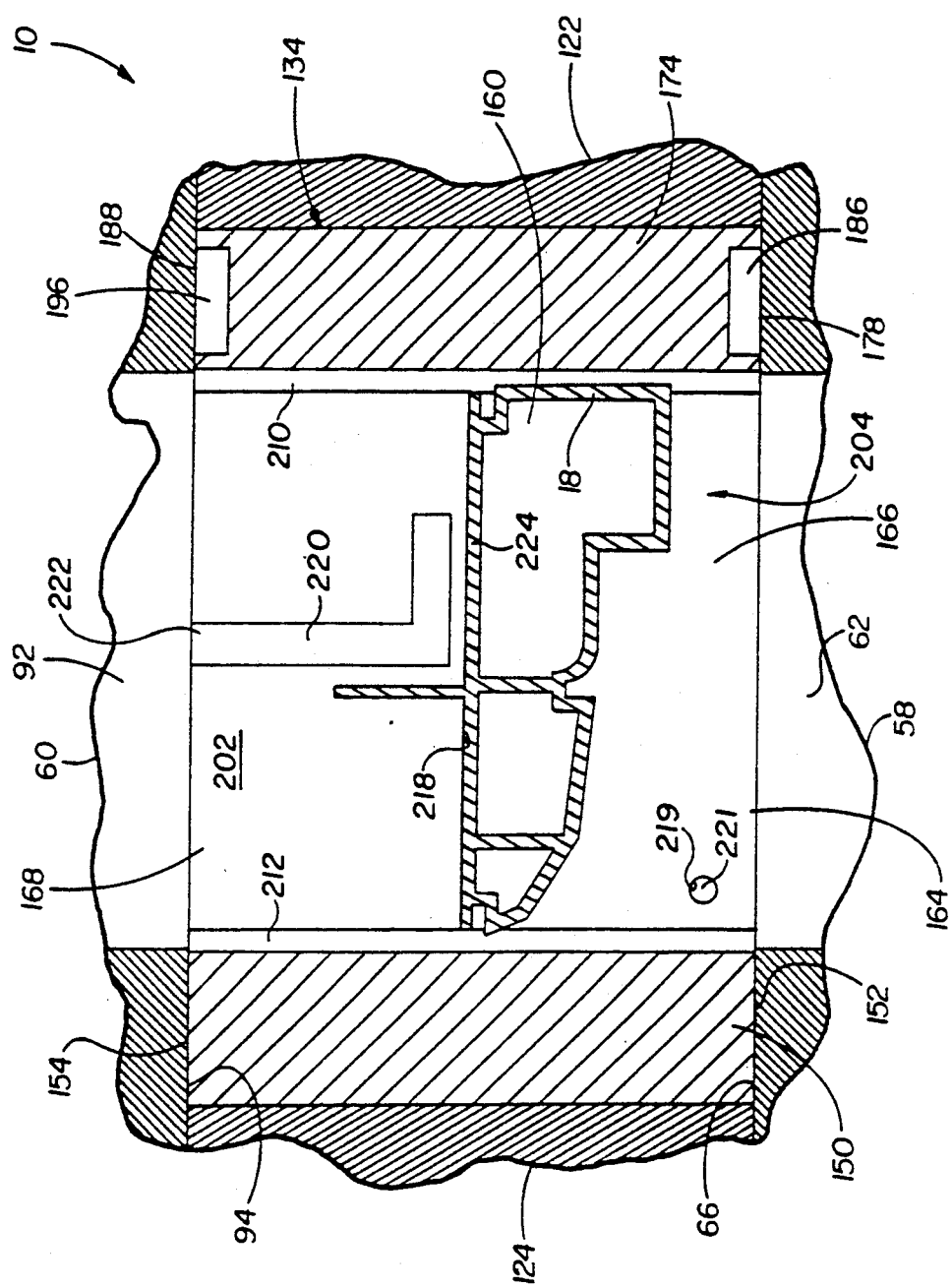
FIG. 5A is an enlarged, fragmentary cross-sectional view of the extrusion calibrator similar to FIG. 5 but taken substantially along the line 5A—5A of FIG. 6A.
Figure 8:
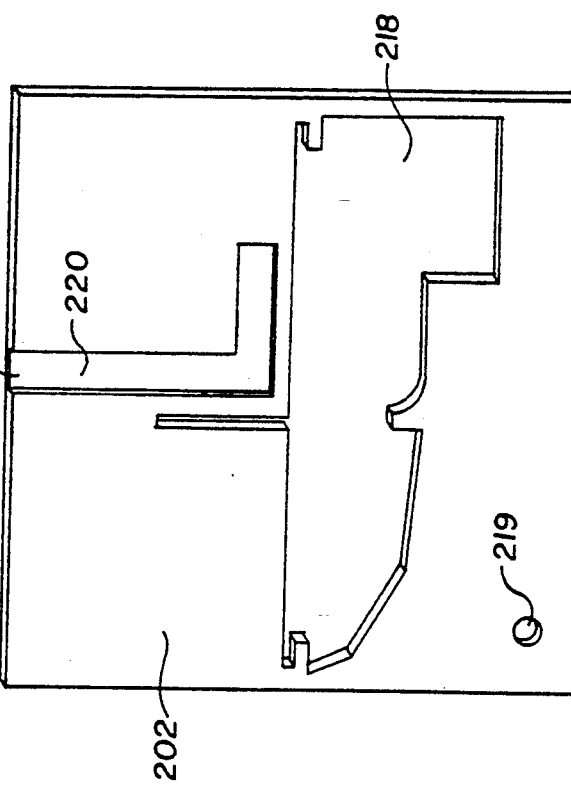
FIG. 8 is a front isometric view of a rearward insert plate of the present invention used with the front insert plate of FIG. 7, showing its front face.
Figure 7:
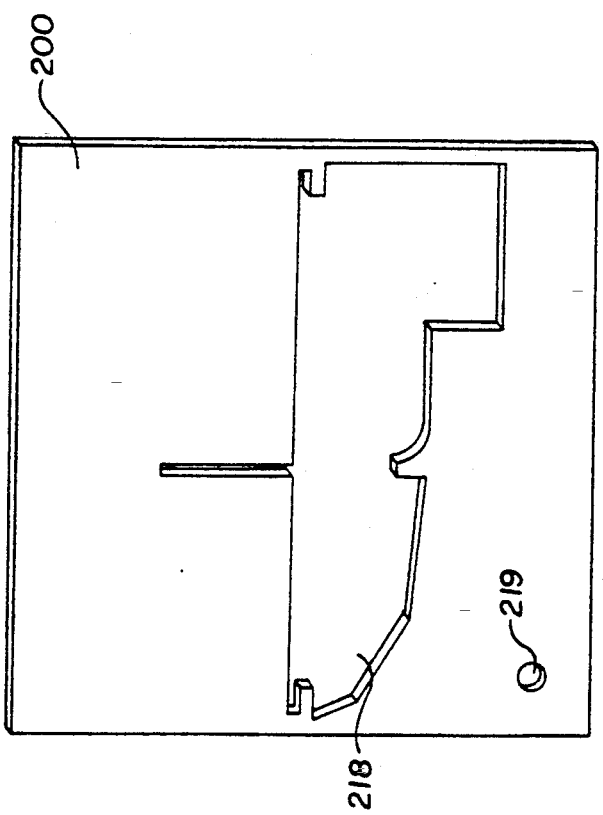
FIG. 7 is a front isometric view of a forward insert plate of the present invention showing its front face.

One pair of the forward and rearward insert plates 200 and 202 is shown separate from the insert 150 in FIGS. 7 and 8, respectively. The rearward insert plate 202 is shown within one of the insert plate apertures 204 in FIGS. 5 and 5A. Since the insert plates 200 and 202, when in position within one of the insert plate apertures 204, intersect the path of the calibrating aperture 160 in the insert 150, each of the insert plates has a correspondingly shaped and sized calibrating aperture 218 cut therein in a position to precisely coincide with the calibrating aperture 160 of the insert. It is noted that when the calibrator 10 is assembled with the pairs of insert plates 200 and 202 installed within the insert plate apertures 204, the insert plates are held tightly between the lower and upper vacuum plates 58 and 60 to maintain the proper vertical alignment of their calibrating apertures 218 with the calibrating aperture 160. The width of the insert plate aperture 204 is sized to correspond closely with the lateral length of the pair of insert plates 200 and 202 received therewithin to maintain proper lateral alignment of the calibrating aperture 218 with the calibrating aperture 160. To further assure alignment, and to securely hold the pairs of insert plates 200 and 202 in position during assembly, disassembly and use of the insert 150, the insert plates and the insert have an alignment bore 219 extending lengthwise therethrough between the forward and rearward faces 156 and 158 of the insert, and an elongated alignment pin 221 extending through the alignment bore 219. The alignment pin 221 helps hold the insert plates in precise alignment with the insert 150 when the insert plates are in the insert plate apertures 204.

Since each pair of insert plates 200 and 202 are held in parallel spaced-apart alignment, uniform spacing is provided between a rearward face of the forward insert plate 200 and a forward face of the rearward insert plate 202 over the entire facial area of the pair of insert plates. Thus, a generally uniform vacuum force will be applied to the extrusion 18, at least among the walls of the extrusion exposed to the lower vacuum slot portion 166 and at least among the walls of the extrusion exposed to the upper vacuum slot portion 168. It is, however, sometimes desirable to apply extra vacuum to a selected portion of the walls of the extrusion 18. This can be done by providing an enlarged passageway in one or both of the pair of insert plates 200 or 202 leading from the lower or upper edge of the insert plate to a location adjacent to the portion of the walls of the extrusion 18 to which the extra vacuum is to be applied.

As can best be seen in FIGS. 5, 5A, 6A, 6B, and FIG. 8, the forward face of the rearward insert plate 202 has a channel 220 formed therein with an open end 22 at the upper edge of the insert plate which communicates with a corresponding one of the vacuum slots 92 in the upper vacuum plate 60. The channel 220 extends downward to a position extending along an elongated, horizontal upper wall portion 224 of the wall of the extrusion 18. By providing a less restricted air path using the channel 220, the vacuum force applied to the upper wall portion 224 of the extrusion will be greater and better hold that wall portion against the interior walls of the calibration apertures 218 of the pair of insert plates 200 and 202, and the neighboring portions of the calibrating aperture 160 of the insert 150

Channels like channel 220 can be provided with whatever shape, size and position as is desired to distribute vacuum to the extrusion 18. This provides a significant degree of control over the amount of vacuum force applied to selected portions of the extrusion 18. Further, channels can be formed in whichever or both of the pair of insert plates 200 and 202, and can be formed in one or more pairs, but need not be formed in all pairs of insert plates. This allows the selective application of increased vacuum to portions of the extrusion 18 where necessary without having to apply increased vacuum to all the walls of the extrusion and thereby create unnecessary drag on the extrusion and unnecessarily increase the pulling force required to pull the extrusion through the calibrator 10. Such increased pulling force applied to the extrusion 18 results in increased undesirable stress on the extrusion.

Since the pair of insert plates 200 and 202 can be easily inserted into and removed from their corresponding insert plate aperture 204, the channel 220 is simply machined into the face of the insert plate and then is inserted into the insert plate aperture. It is noted that to ensure precise alignment of the calibrating apertures 218 of the insert plates 200 and 202 with the calibrating aperture 160 of the insert 150, the calibrating apertures of the insert and the insert plates are cut at the same time while the insert plates are installed within their insert plate apertures 204 of the insert.

In a typical embodiment of the calibrator 10 used for window frame extrusions, the insert plates 200 and 202 each have a thickness of 0.125 inches and they are separated to define an insert slot with a gap of 0.030 inches.

Since the greatest wear potential is in the vicinity of the insert slots 164 where the walls of the extrusion 18 are pulled tightest against the interior walls of the calibrating aperture 160 by the vacuum applied through the insert slots, the more abrasion-resistant stainless steel material of the insert plates 200 and 202 will better resist the wear and thereby extend the life of the insert 150. While superior wear results by using the stainless steel insert plates 200 and 202, the benefit of the superior cooling achievable by the aluminum insert 150 with circulating cooling water is still provided. Should wear eventually occur to the insert plates, they can be easily removed and replaced without replacing the entire insert 150. This results in a substantial savings.

Even with the use of stainless steel insert plates 200 and 202, it is still necessary to treat the aluminum insert 150 to resist wear, such as by anodizing or ion implantation to harden and protect the aluminum and reduce its coefficient of friction. This is done by placing the blank insert plates 200 and 202 without the calibration aperture 218 cut therein into their corresponding insert plate apertures 204, and cutting the calibrating apertures 218 of the insert plates and the calibrating aperture 160 of the insert 150 at the same time, as described above, and then removing the cut insert plates to permit treatment of the aluminum insert. After the insert 150 is treated, the insert plates 200 and 202 can be easily re-installed. This reduces the cost of manufacturing the calibrator 10. Savings also result by maintaining an inventory of blank insert plates 200 and 202 which are quickly available for cutting of calibrating apertures 218 therein when needed.

Cleaning of the aperture 150 and the insert slots 164 becomes much less difficult, expensive and time-consuming with the use of the removable pairs of insert plates 200 and 202. To accomplish cleaning, the insert plates can be easily and quickly removed, cleaned and replaced. Since the narrow insert slot 164 is opened wide for access when the insert plates are removed and separated, cleaning inside the narrow insert slot is not a problem. Further, residue polish used in cleaning will not be difficult to remove from the faces of the insert plates that form the insert slot, as can be the case with a narrow insert slot cut directly in the insert 150. With the present invention, the cost of manufacturing, cleaning and repairing the calibrator 10 is reduced and made easier.

An alternative design for the insert 150 is shown in FIG. 9 using a different shape calibrating aperture 160. In this embodiment, the insert slots are formed in a vacuum member 230 received in insert apertures 232. The member 230 has a forward plate portion and a rearward plate portion joined at their left and right edges to define at least one aperture therebetween. Only the forward insert portion 174 is illustrated (without water channels).

As previously noted, it is important to cool the extrusion 18 as it moves through the calibrator 10 so that by the time the extrusion 18 leaves the calibrating aperture 160, it is sufficiently rigid to maintain the desired shape and size of the finished extrusion. If necessary, the extrusion 18 could be passed through a second calibrator if further cooling is needed.

Figure 6A:
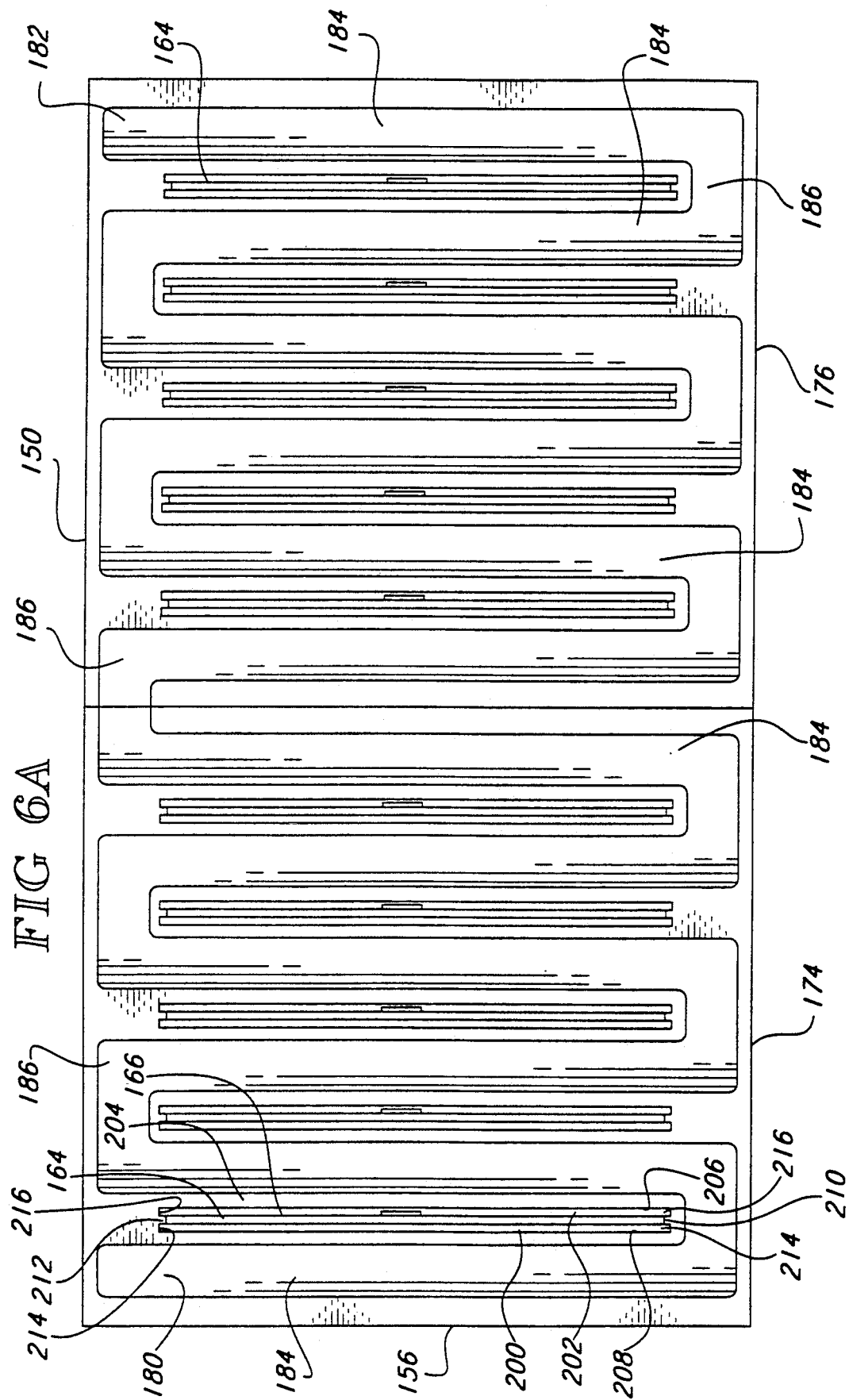
FIG. 6A is an enlarged-scale, bottom plan view of a calibrating insert used in the extrusion calibrator of FIG. 1.

To accomplish the cooling, the insert 150 has a lower water channel 178 formed in the lower side 152 thereof, as best shown in FIG. 6A. The lower water channel 178 has an end portion 180 which is positioned to be in alignment with and receive cooling water from the port 76 of the supply lower channel 68 formed in the upper side 66 of the lower vacuum plate 58. Cooling water is supplied to the lower water channel 178 by the hose 78 connected to the supply water conduit 80 which supplies pressurized cooling water from the external water source 14. The lower water channel 178 extends from the end portion 180 thereof back and forth across the lower face 152 of the insert 150 weaving between the lower vacuum slot portion 166 openings in the lower face which communicate vacuum to the extrusion 18 (outward of the lower ends of the insert plate apertures 204), and terminates in an end portion 182 positioned to be in alignment with and communicate the heated exhaust water to the port 88 of the return lower channel 82 formed in the upper side 66 of the lower vacuum plate 58. As previously described, the return lower water channel 82 is connected by the hose 90 to the return water conduit 91 which returns the water to the external water source 14.

The lower water channel 178 is formed by a plurality of interconnecting straight lengthwise portions 184 which extend transverse to the calibrating aperture 160 and the direction of movement of the extrusion 18 indicated by the arrow 20 in FIG. 1A as it passes through the calibrator 10. The lengthwise portions 184 are positioned spaced apart and generally aligned with the lower vacuum slot portions 166. Each of the transverse lengthwise portions 184 are interconnected at one end or the other with the adjacent transverse lengthwise portion by a connector portion 186 to provide a continuous water channel between the openings 76 and 88 of the supply lower channel 68 and the return lower channel 82.

The lower water channel 178 is formed from a downwardly opened surface groove in the lower side 152 of the insert 150. The opened side of the surface groove is sealed by the upper side 66 of the lower vacuum plate 58 when the insert 150 is positioned within the interior chamber 134 for operation. In such fashion, the lower water channel 178 may be simply machined into the lower side 152 of the insert 150 and when in position against the lower vacuum plate 58, a water tight conduit is defined which extends between the ports 76 and 88 of the supply lower channel 68 and the return lower channel 82.

In the embodiment of the insert 150 illustrated in FIG. 2, the lower water channel 178 has a forward channel portion formed on the lower side 152 of the forward insert portion 174 and a rearward channel portion formed on the lower side of the rearward insert portion 176. Together, the forward and rearward channel portions define the lower water channel 178.

Figure 6B:
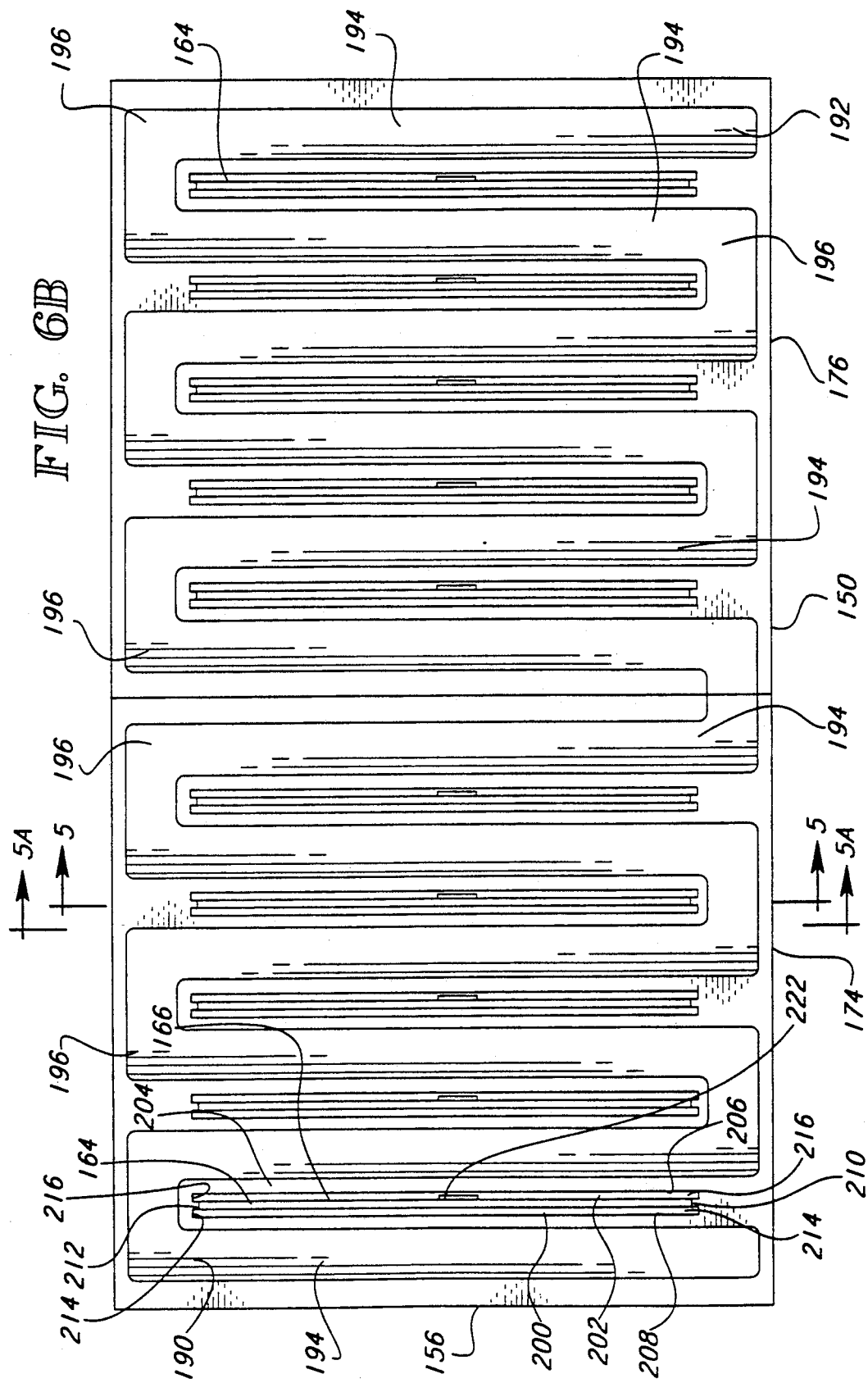
FIG. 6B is a top plan view of the insert of FIG. 6A.

To better accomplish cooling, the insert 150 also has an upper water channel 188 formed in the upper side 15 thereof, as best shown in FIG. 6B. The upper water channel 188 has an end portion 190 which is positioned to be in alignment with and receive cooling water from the port 106 of the supply upper channel 98 formed in the lower side 94 of the upper vacuum plate 60. Cooling water is supplied to the upper water channel 188 by the hose 108 connected to the supply water conduit 80 which supplies pressurized cooling water from the external water source 14. The upper water channel 188 extends from the end portion 190 thereof back and forth across the upper face 154 of the insert 150 weaving between the upper vacuum slot portion 168 openings in the upper face which communicate vacuum to the extrusion 18 (outward of the upper ends of the insert plate apertures 204), and terminates in an end portion 192 positioned to be in alignment with and communicate the heated exhaust water to the port 118 of the return upper channel 112 formed in the lower side 94 of the upper vacuum plate 60. As previously described, the return upper water channel 112 is connected by the hose 120 to the return water conduit 91 which returns the water to the external water source 14.

The upper water channel 188 is formed by a plurality of interconnecting straight lengthwise portions 194 which extend transverse to the calibrating aperture 160 and the direction of movement of the extrusion 18 indicated by the arrow 20 in FIG. 1A as it passes through the calibrator 10. The lengthwise portions 194 are positioned spaced apart and generally aligned with the upper vacuum slot portions 168. Each of the transverse lengthwise portions 194 are interconnected at one end or the other with the adjacent transverse lengthwise portion 194 by a connector portion 196 to provide a continuous water channel between the openings 106 and 118 of the supply upper channel 98 and the return upper channel 112.

The upper water channel 188 is formed from an upwardly opened surface groove in the upper side 154 of the insert 150. The opened side of the surface groove is sealed by the lower side 94 of the upper vacuum plate 60 when the insert 150 is positioned within the interior chamber 134 for operation. In such fashion, the upper water channel 188 may be simply machined into the upper side 154 of the insert 150 and when in position against the upper vacuum plate 60, a water tight conduit is defined which extends between the ports 106 and 118 of the supply upper channel 98 and the return upper channel 112.

In the embodiment of the insert 150 illustrated in FIG. 2, the upper water channel 188 has a forward channel portion formed on the upper side 154 of the forward insert portion 174 and a rearward channel portion formed on the upper side of the rearward insert portion 176. Together, the forward and rearward channel portions define the upper water channel 188.

Seals may be utilized if desired to eliminate water and vacuum leaks between the components of the calibrator, but with the illustrated embodiment no further seals beyond those described are necessary since the components are fit tightly together.

With the calibrator 10 of the present invention, the lower and upper cover plates 22 and 24, upper and lower vacuum plates 58 and 60, left and right sidewalls 122 and 124, and front and rear cover plates 126 and 128 form a box which defines the chamber 134. The external water and vacuum sources 14 and 16 are permanently connected to the box and can remain undisturbed even though the insert 150 must be removed. Removal is quickly and easily accomplished by first releasing the cinch clamps 132 and removing the uppermost six screws S1, removing the four bolts which project down through the fastening holes H6 and H7 and are reached through the access holes H8, and then rotating the upper cover plate 24 and the upper vacuum plate 60 as a unit about the hinge 140. The lower cover plate 22 is fixedly attached to the stationary support 12 and remains stationary and fully assembled with the lower vacuum plate 58, the right and left sidewalls 122 and 124 and front and the rear cover plates 126 and 128. The insert 150 is easily removed from the interior chamber 134 through the access opening without disturbing the connections of the external water and vacuum sources 14 and 16 to the calibrator 10. Further, since the lower cover plate 22 remains fixedly attached to the stationary support 12, the calibrator 10 remains aligned with the extruding die.

The insert 150 can be removed for cleaning or replacement. When the insert 150 or a replacement therefor is repositioned within the interior chamber 134 through the access opening, and the pairs of insert plates 200 and 204 are installed in their insert plate apertures 204, the upper cover plate 24 and the upper vacuum plate 60 can be rotated as a unit about the hinge 140 into the closed position. Then, the cinch clamps 132 are closed and the uppermost six screws S1 inserted and tightened, and the four bolts are inserted into the fastening holes H6 and H7 and tightened to lock the upper cover plate and upper vacuum plate in position for operation of the calibrator 10. Since the hoses 44, 56, 78, 90, 108 and 120 which connect the calibrator to the external water and vacuum sources 14 and 16 were never removed, time does not have to be spent reattaching these hoses as with prior art calibrators. Furthermore, since the lower cover plate 22 was never detached from the stationary support 12, time does not have to be spent realigning the calibrator 10 with the extruding die as with prior art calibrators. Further, since the vacuum slots 62 and 92 in the lower and upper vacuum plates 58 and 60 communicate vacuum with the insert slots 164 in the insert 150 without requiring any internal connections, and the supply and return lower and upper water channels 68, 82, 98 and 112 require no internal connections to communicate cooling water to the lower and upper water channels 178 and 194 of the insert 150, no time is required for making these connections. One simply places the insert 150 or the replacement therefor within the interior chamber 134 and the calibrator is ready for operation.

Unlike with prior art calibrators, when it is desired to change the production line over to a new extrusion profile, or it is necessary to remove the insert 150 for cleaning or replacement, the process can be accomplished easily and quickly with minimum production line downtime. The entire calibrator does not have to be dismantled and reassembled, with the external water and vacuum source connections being removed and reattached. Further, the cost of changing to a new extrusion profile or replacing the insert 150 and the pairs of insert plates 200 and 202 should the calibrating aperture 160 become worn beyond the possibility of refurbishing with new insert plates, is much reduced compared to prior art calibrators where the entire calibrator had to be replaced at great cost. With the calibrator 10 of the present invention, only the insert plates 200 and 202, or at worse the insert 150, must be replaced. This reduces the amount of material and machining time required to accomplish changeover to a new extrusion profile or replacement of a worn calibrating aperture.

The present invention also reduces the lead time previously required to develop a new extrusion profile and put into production after an order is received. Since only the insert 150 and the insert plates 200 and 202 need be machined, the lead time required is substantially reduced. The lead time can be even further reduced since the present invention makes it economical to create an inventory of partially manufactured inserts 150 having the lower and upper water channels 178 and 194, and the insert plate apertures 204 already machined therein, thus leaving only the machining of the calibrating aperture 160 itself to be performed once a new extrusion profile is developed. Similarly, blank insert plates 200 and 202 may be manufactured in advance and held in inventory.

For the same reasons, when an existing extrusion profile is to be manufactured in quantities larger than the life of the calibrating aperture 160, the present invention makes it economical to create an inventory of spare inserts and insert plates. When the calibrating aperture 160 finally wears to the point of requiring replacement, the upper cover plate 24 and the upper vacuum plate 60 are simply disconnected and rotated in the open position to permit the removal of the existing insert, the replacement insert or insert plates, as is required, are positioned in their place, and the upper cover plate and upper vacuum plate rotated back into the close position. Only the worn insert or insert plates need be replaced.

Another advantage of the present invention is that only the insert 150 need be manufactured from a material selected for its heat conduction properties, and the other components of the calibrator 10 can be manufactured from any other convenient and more economical material. With prior art calibrators, the entire calibrator was typically manufactured from the same heat-conducting material.

It will be appreciated that, although specific embodiments of the invention have been described herein for purposes of illustration, various modifications may be made without departing from the spirit and scope of the invention. Accordingly, the invention is not limited except as by the appended claims.

We claim:

1. An extrusion calibrating apparatus for use on a stationary support and connectable to an external source of cooling water and an external source of vacuum, the apparatus being usable to calibrate the exterior profile of a hollow thermoplastic extrusion upon its exit from an extruding die while the extrusion is still in a heated plastic state, comprising:

a lower cover plate having a lower vacuum manifold formed on an upper side thereof and having a lower vacuum channel providing communication between said lower vacuum manifold and the source of vacuum, said lower cover plate having attachment members fixedly attachable to the stationary support;

an upper cover plate having an upper vacuum manifold formed on a lower side thereof and having an upper vacuum channel providing communication between said upper vacuum manifold and the source of vacuum;

a lower vacuum plate having a plurality of vacuum plate apertures extending between a lower and an upper side thereof with said vacuum plate apertures having openings in said lower side of said lower vacuum plate in communication with said lower vacuum manifold, and openings in said upper side of said lower vacuum plate, said lower vacuum plate further having supply and return lower water channels providing communication between spaced-apart interior supply and return ports in said upper side of said lower vacuum plate and the source of water, said lower side of said lower vacuum plate being in face-to-face juxtaposition with said upper side of said lower cover plate;

an upper vacuum plate having a plurality of vacuum plate apertures extending between a lower and an upper side thereof with said vacuum plate apertures having openings in said upper side of said upper vacuum plate in communication with said upper vacuum manifold, and openings in said lower side of said upper vacuum plate, said upper vacuum plate further having supply and return upper water channels providing communication between spaced-apart interior supply and return ports in said lower side of said upper vacuum plate and the source of water, said upper side of said upper vacuum plate being in face-to-face juxtaposition with said lower side of said upper cover plate;

right and left sidewalls;

front and rear cover plates which, with said lower and upper vacuum plates and said right and left sidewalls, define an interior chamber, said front cover plate having an aperture sized to allow the extrusion to pass unobstructed therethrough on its entry into said interior chamber and said rear cover plate having an aperture sized to allow the extrusion to pass unobstructed therethrough on its exit from said interior chamber, said upper cover plate and upper vacuum plate being selectively movable to provide an access opening to said interior chamber;

a heat-conducting calibrating insert sized to pass through said access opening and be removably positioned within said interior chamber with a lower side in face-to-face juxtaposition with said upper side of said lower vacuum plate and an upper side in face-to-face juxtaposition with said lower side of said upper vacuum plate, said insert having forward and rearward faces with a calibrating aperture corresponding to the exterior profile of the extrusion extending lengthwise therebetween, said insert calibrating aperture having a forward opening in said insert forward face aligned with said front cover plate aperture to permit the unobstructed entry of the extrusion into said insert calibrating aperture forward opening and a rearward opening in said insert rearward face aligned with said rear cover plate aperture to permit the unobstructed exit of the extrusion out of said insert calibrating aperture rearward opening, said insert having a plurality of plate receiving apertures extending between said insert lower and upper sides, and extending transverse to the lengthwise direction of said insert calibrating aperture and intersecting with said insert calibrating aperture, said insert lower side having a lower water channel formed therein extending to communicate between said spaced-apart supply and return ports in said upper side of said lower vacuum plate and said insert upper side having an upper water channel formed therein extending to communicate between said spaced-apart supply and return ports in said lower side of said upper vacuum plate, said upper cover plate and upper vacuum plate being movable while said lower cover plate remains fixedly attached to the stationery support with said lower vacuum plate, right and left sidewalls and front and rear cover plates assembled and attached thereto to permit the removal of said insert from said interior chamber through said access opening while the apparatus remains connected to the external sources of water and vacuum and aligned with the extruding die, and the repositioning of said insert or a replacement therefor within said interior chamber through said access opening; and a plurality of pairs of plates fabricated from a material having a greater wear resistance than said insert, each of said pairs of plates having a forward plate and a rearward plate with a calibrating aperture corresponding to said insert calibrating aperture, and being removably positioned within one of said plate receiving apertures with said plate calibrating apertures thereof in alignment with said insert calibrating aperture, said forward and rearward plates of each of said pairs of plates being held in spaced-apart positions within one of said plate receiving apertures to define therebetween a lower vacuum aperture extending between said insert lower side and said plate calibrating apertures with said lower vacuum aperture having an opening at said insert lower side in communication with at least one of said openings in said upper side of said lower vacuum plate, and an upper vacuum aperture extending between said insert upper side and said plate calibrating apertures with said upper vacuum aperture having an opening at said insert upper side in communication with at least one of said openings in said lower side of said upper vacuum plate.

2. The apparatus of claim 1, further including a hinge connected between one of said upper cover plate or upper vacuum plate and one of said left or right sidewalls, and wherein said upper cover plate and said upper vacuum plate are fixedly attached together, whereby removal of said upper cover plate and upper vacuum plate may be accomplished by rotating said upper cover plate and upper vacuum plate as a unit relative to said lower cover plate, lower vacuum plate, right and left sidewalls and front and rear cover plates.

3. The apparatus of claim 1 wherein said lower and upper vacuum plate apertures are a plurality of slots, each slot extending transverse to the lengthwise direction of said insert calibrating aperture, said slots being arranged in spaced-apart positions along the length of said insert calibrating aperture.

4. The apparatus of claim 3 wherein said plate receiving apertures are arranged in spaced-apart positions along the length of said insert calibrating aperture in positions corresponding to the positions of said vacuum plate slots, each of said vacuum plate slots in said lower and upper vacuum plates being positioned to communicate vacuum with a corresponding one of said lower or upper vacuum apertures of said pairs of plates.

5. The apparatus of claim 4 wherein each of said lower and upper water channels of said insert is formed of a plurality of interconnected lengthwise portions, each lengthwise portion being positioned spaced-apart from and generally aligned with at least one of said plate receiving apertures.

6. The apparatus of claim 1 wherein said right and left sidewalls are positioned and extend between said upper side of said lower vacuum plate and said lower side of said upper vacuum plate, said lower and upper vacuum plates each having a perimeter edgewall with exterior supply and return ports therein in communication with the corresponding ones of said supply and return water channels, said exterior supply and return ports being connectable to the source of water.

7. The apparatus of claim 1 wherein said lower and upper cover plates each has a perimeter edgewall with an exterior port therein in communication with the corresponding one of said lower or upper vacuum channel, said exterior port being connectable to the source of vacuum.

8. The apparatus of claim 1 wherein said lower and upper water channels of said insert each include a surface groove formed in an outer face surface of said lower and upper sides, respectively, with said surface groove being sealed by an outer face surface of the corresponding one of said lower and upper vacuum plates to define a water-tight conduit extending between said supply and return ports in a corresponding one of said lower or upper vacuum plates.

9. The apparatus of claim 1 wherein said insert includes separable forward and rearward insert portions, said forward insert portion having a rearward face and said rearward insert portion having a forward face in face-to-face juxtaposition, said insert calibrating aperture including a forward portion formed within said forward insert portion and terminating at said rearward face of said forward insert portion and a rearward portion formed within said rearward insert portion and terminating at said forward face of said rearward insert portion, a plurality of each of said lower and upper vacuum apertures of said pairs of plates being provided in each of said forward and rearward insert portions in communication with a corresponding one of said forward and rearward insert calibrating aperture portions, said lower and upper vacuum manifolds of said lower and upper cover plates each including a forward vacuum manifold portion and a rearward manifold portion, said forward manifold portions of said lower and upper cover plates being in communication through said lower and upper vacuum plates with said lower and upper vacuum apertures of said forward insert portion, and said rearward manifold portions of said lower and upper cover plates being in communication through said lower and upper vacuum plates with said lower and upper vacuum apertures of said rearward insert portion.

10. The apparatus of claim 9 wherein said lower water channel includes a forward channel portion formed on a lower side of said forward insert portion, and a rearward channel portion formed on a lower side of said rearward insert portion, and said upper water channel includes a forward channel portion formed on an upper side of said forward insert portion, and a rearward channel portion formed on an upper side of said rearward insert portion.

11. The apparatus of claim 1 wherein said forward and rearward plates of each of said pairs of plates are separate parts, and spacers are positioned within each of said plate receiving apertures to hold said forward and rearward plates when positioned therein in said spaced-apart positions.

12. The apparatus of claim 1 wherein said forward and rearward plates of each of said pairs of plates are rigidly connected together in spaced-apart relation to form said lower and upper vacuum apertures therebetween.

13. The apparatus of claim 1 wherein at least one of said forward or rearward plates of at least one of said pairs of plates has a channel formed in a forward or rearward face thereof facing toward the other of said forward or rearward plate when within one of said plate receiving apertures, said channel extending from one of said insert lower or upper sides and terminating at a location adjacent to said plate calibrating aperture to apply increased vacuum force to the portion of the extrusion passing by said location.

14. The apparatus of claim 1 wherein said insert is composed of aluminum, and said forward and rearward plates are composed of stainless steel.

15. An extrusion calibrating apparatus for use on a stationary support and connectable to an external source of cooling water and an external source of vacuum, the apparatus being usable to calibrate the exterior profile of a hollow extrusion upon its exit from an extruding die while the extrusion is still in a heated plastic state, comprising:

a lower assembly having a lower vacuum manifold and a lower vacuum channel providing communication between said lower vacuum manifold and the source of vacuum, said lower assembly having a plurality of vacuum assembly apertures extending between said lower vacuum manifold and openings in an upper side thereof, said lower assembly further having supply and return lower water channels providing communication between spaced-apart interior supply and return ports in said upper side of said lower assembly and the source of water, said lower assembly having attachment members fixedly attachable to the stationary support;

an upper assembly having an upper vacuum manifold and an upper vacuum channel providing communication between said upper vacuum manifold and the source of vacuum, said upper assembly having a plurality of vacuum assembly apertures extending between said upper vacuum manifold and openings in a lower side thereof, said upper assembly further having supply and return upper water channels providing communication between spaced-apart interior supply and return ports in said lower side of said upper assembly and the source of water;

a heat-conducting calibrating insert removably positioned between said lower and upper assemblies with a lower side in face-to-face juxtaposition with said upper side of said lower assembly and an upper side in face-to-face juxtaposition with said lower side of said upper assembly, said insert having forward and rearward faces with a calibrating aperture corresponding to the exterior profile of the extrusion extending lengthwise therebetween, said insert calibrating aperture having a forward opening in said insert forward face to permit the entry of the extrusion into said insert calibrating aperture and a rearward opening in said insert rearward face to permit the exit of the extrusion out of said insert calibrating aperture, said insert having a plurality of plate receiving apertures extending between said insert lower and upper sides, and intersecting with said insert calibrating aperture, said insert having a lower water channel formed therein toward said lower side thereof and extending to communicate between said spaced-apart supply and return ports in said upper side of said lower assembly, and an upper water channel formed therein toward said upper side thereof and extending to communicate between said spaced-apart supply and return port in said lower side of said upper assembly; and a plurality of pairs of plates fabricated from a material having a greater wear resistance than said insert, each of said pairs of plates having a forward plate and a rearward plate with a calibrating aperture corresponding to said insert calibrating aperture, and being removably positioned within one of said plate receiving apertures with said plate calibrating apertures thereof in alignment with said insert calibrating aperture, said forward and rearward plates of each of said pairs of plates being held in spaced-apart positions within one of said plate receiving apertures to define therebetween a lower vacuum aperture extending between said insert lower side and said plate calibrating apertures with said lower vacuum aperture having an opening at said insert lower side in communication with at least one of said openings in said upper side of said lower assembly, and an upper vacuum aperture extending between said insert upper side and said plate calibrating apertures with said upper vacuum aperture having an opening at said insert upper side in communication with at least one of said openings in said lower side of said upper assembly.

16. The apparatus of claim 15 wherein at least a portion of said upper assembly is movable relative to said lower assembly to permit removal of said insert from its position between said upper and lower assemblies.

17. An extrusion calibrating apparatus for use on a stationary support and connectable to an external source of cooling water and an external source of vacuum, the apparatus being usable to calibrate the exterior profile of a hollow extrusion upon its exit from an extruding die while the extrusion is still in a heated plastic state, comprising:

a first assembly having a first vacuum manifold and a first vacuum channel providing communication between said first vacuum manifold and the source of vacuum, said first assembly having a plurality of vacuum assembly apertures extending between said first vacuum manifold and openings in a first side thereof, said first assembly further having supply and return water channels providing communication between spaced-apart interior supply and return ports in said first assembly and the source of water, said first assembly having attachment members fixedly attachable to the stationary support;

a second assembly having a second vacuum manifold and a second vacuum channel providing communication between said second vacuum manifold and the source of vacuum, said second assembly having a plurality of vacuum assembly apertures extending between said second vacuum manifold and openings in a first side thereof, said second assembly further having supply and return water channels providing communication between spaced-apart interior supply and return ports in said second assembly and the source of water;

a heat-conducting calibrating insert removably positioned between said first and second assemblies with a first side in face-to-face juxtaposition with said first side of said first assembly and a second side in face-to-face juxtaposition with said first side of said second assembly, said insert having forward and rearward faces with a calibrating aperture corresponding to the exterior profile of the extrusion extending lengthwise therebetween, said insert calibrating aperture having a forward opening in said insert forward face to permit the entry of the extrusion into said insert calibrating aperture and a rearward opening in said insert rearward face to permit the exit of the extrusion out of said insert calibrating aperture, said insert having a plurality of plate receiving apertures extending between said insert first and second sides, and intersecting with said insert calibrating aperture, said insert having a first water channel formed therein toward said first side thereof and extending to communicate between said spaced-apart supply and return ports of said first assembly, and a second water channel formed therein toward said second side thereof and extending to communicate between said spaced-apart supply and return ports in said first side of said second assembly; and a plurality of pairs of plates fabricated from a material having a greater wear resistance than said insert, each of said pairs of plates having a forward plate and rearward plate with a calibrating aperture corresponding to said insert calibrating aperture, and being positioned within one of said plate receiving apertures with said plate calibrating apertures thereof in alignment with said insert calibrating aperture, said forward and rearward plates of each of said pairs of plates being held in spaced-apart positions within one of said plate receiving apertures to define therebetween a first vacuum aperture extending between said insert first side and said plate calibrating apertures with said first vacuum aperture having an opening at said insert first side in communication with at least one of said openings in said first side of said first assembly, and a second vacuum aperture extending between said insert second side and said plate calibrating apertures with said second vacuum aperture having an opening at said insert second side in communication with at least one of said openings in said first side of said second assembly.

18. The apparatus of claim 17 wherein said vacuum assembly apertures of said first and second assemblies are a plurality of slots, each slot extending transverse to the lengthwise direction of said insert calibrating aperture, said slots being arranged in spaced-apart positions along the length of said insert calibrating aperture.

19. The apparatus of claim 18 wherein said plate receiving apertures are arranged in spaced-apart positions along the length of said insert calibrating aperture in positions corresponding to the positions of said vacuum plate slots, each of said vacuum plate slots in said first and second assemblies being positioned to communicate vacuum with a corresponding one of said first and second vacuum apertures of said pairs of plates.

20. The apparatus of claim 19 wherein each of said first and second water channels of said insert is formed of a plurality of interconnected lengthwise portions, each lengthwise portion being positioned spaced-apart from and generally aligned with at least one of said plate receiving apertures.

21. The apparatus of claim 17 wherein said forward and rearward plates of each of said pairs of plates are separate parts, and spacers are positioned within each of said plate receiving apertures to hold said forward and rearward plates when positioned therein in said spaced-apart positions.

22. The apparatus of claim 17 wherein said forward and rearward plates of each of said pairs of plates are rigidly connected together in spaced-apart relation to form said lower and upper vacuum apertures therebetween.

23. The apparatus of claim 17 wherein at least one of said forward or rearward plates of at least one of said pairs of plates has a channel formed in a forward or rearward face thereof facing toward the other of said forward or rearward plate when within one of said plate receiving apertures, said channel extending from one of said insert first or second sides and terminating at a location adjacent to said plate calibrating aperture to apply increased vacuum force to the portion of the extrusion passing by said location.

24. The apparatus of claim 17 wherein said insert is composed of aluminum, and said forward and rearward plates are composed of stainless steel.

25. An extrusion calibrating apparatus for use on a stationary support and connectable to an external source of cooling water and an external source of vacuum, the apparatus being usable to calibrate the exterior profile of a hollow extrusion upon its exit from an extruding die while the extrusion is still in a heated plastic state, comprising:

a first assembly having a first vacuum manifold and a first vacuum channel providing communication between said first vacuum manifold and the source of vacuum, said first assembly having a plurality of vacuum assembly apertures extending between said first vacuum manifold and openings in a first side thereof;

a second assembly having a second vacuum manifold and a second vacuum channel providing communication between said second vacuum manifold and the source of vacuum, said second assembly having a plurality of vacuum assembly apertures extending between said second vacuum manifold and openings in a first side thereof, at least one of said first or second assemblies further having supply and return water channels providing communication between spaced-apart interior supply and return ports and the source of water, one of said first or second assemblies having attachment members fixedly attachable to the stationary support;

a heat-conducting calibrating insert removably positioned between said first and second assemblies with a first side in face-to-face juxtaposition with said first side of said first assembly and a second side in face-to-face juxtaposition with said first side of said second assembly, said insert having a calibrating aperture corresponding to the exterior profile of the extrusion extending lengthwise therethrough, said insert calibrating aperture having an entry opening to permit the entry of the extrusion into said insert calibrating aperture and an exit opening to permit the exit of the extrusion out of said insert calibrating aperture, said insert having a plurality of vacuum member receiving apertures extending between said insert first and second sides, and intersecting with said insert calibrating aperture, said insert having a water channel formed therein and extending to communicate between said spaced-apart supply and return ports; and a plurality of vacuum members fabricated from a material having a greater wear resistance than said insert, each of said vacuum members having a calibrating aperture corresponding to said insert calibrating aperture, and being positioned within one of said vacuum member receiving apertures with said member calibrating aperture thereof in alignment with said insert calibrating aperture, said vacuum member having a first vacuum aperture extending between said insert first side and said member calibrating aperture with said first vacuum aperture having an opening at said insert first side in communication with at least one of said openings in said first side of said first assembly, and a second vacuum aperture extending between said insert second side and said member calibrating aperture with said second vacuum aperture having an opening at said inset upper side in communication with at least one of said openings in said first side of said second assembly.

26. An extrusion calibrating apparatus for use on a stationary support and connectable to an external source of vacuum, the apparatus being usable to calibrate the exterior profile of a hollow extrusion upon its exit from an extruding die while the extrusion is still in a heated plastic state, comprising:

first and second assemblies, said first assembly having a vacuum manifold, a vacuum channel providing communication between said vacuum manifold and the source of vacuum, and a plurality of vacuum apertures extending between said vacuum manifold and openings in a first side of said first assembly, one of said first or second assemblies having attachment members fixedly attachable to the stationary support;

a heat-conducting calibrating insert removably positioned between said first and second assemblies with a first side in face-to-face juxtaposition with said first side of said first assembly, said insert having a calibrating aperture corresponding to the exterior profile of the extrusion extending lengthwise therethrough, said insert calibrating aperture having an entry opening to permit the entry of the extrusion into said insert calibrating aperture and an exit opening to permit the exit of the extrusion out of said insert calibrating aperture, said insert having a plurality of plate receiving apertures intersecting with said insert calibrating aperture, each of said plate receiving apertures having a plate entry opening at said insert first side; and a plurality of pairs of plates, each of said pairs of plates having a first plate and a second plate with a calibrating aperture corresponding to said insert calibrating aperture, and being removably positioned within one of said plate receiving apertures with said plate calibrating apertures thereof in alignment with said insert calibrating aperture, said first and second plates being sized to pass through said plate entry opening of one of said plate receiving apertures within which positioned, said first and second plates of each of said pairs of plates being held in spaced-apart positions within said one plate receiving aperture to define therebetween a vacuum aperture extending between said insert first side and said plate calibrating apertures with said vacuum aperture having an opening at said insert first side in communication with at least one of said openings in said first side of said first assembly.

27. An extrusion calibrating apparatus for use on a stationary support and connectable to an external source of cooling water and an external source of vacuum, the apparatus being usable to calibrate the exterior profile of a hollow extrusion upon its exit from an extruding die while the extrusion is still in a heated plastic state, comprising:

a chamber having an interior cavity and a plurality of vacuum apertures with inward openings communicating with said interior cavity, said chamber having at least one vacuum channel providing communication between said vacuum apertures and the source of vacuum, said chamber further having spaced-apart interior supply and return ports and supply and return water channels providing communication between said supply and return ports and the source of water, said chamber further including an attachment portion fixedly attachable to the stationary support, said chamber having a movable closure member to define a closeable access opening to said interior cavity;

a heat-conducting calibrating insert sized to pass through said access opening and be removably positioned within said interior cavity, said insert having a calibrating aperture extending lengthwise therethrough which corresponds to the exterior profile of the extrusion, said calibrating aperture having an entry opening to permit the entry of the extrusion into said calibrating aperture and an exit opening to permit the exit of the extrusion out of said calibrating aperture, said insert further having a plurality of plate receiving apertures intersecting with said insert calibrating aperture, said insert further having a water channel formed therein, said water channel of said insert extending along said insert between said spaced-apart supply and return ports of said chamber when said insert is positioned within said cavity, said insert being selectively removable from and positionable within said cavity through said access opening; and a plurality of pairs of plates fabricated from a material having a greater wear resistance than said insert, each plate having a calibrating aperture corresponding to said insert calibrating aperture, each of said pairs of plates being positioned within one of said plate receiving apertures with said plate calibrating apertures thereof in alignment with said insert calibrating aperture, said plates of each of said pairs of plates being held in spaced-apart positions within one of said plate receiving apertures to define therebetween a vacuum aperture extending between said plate calibrating apertures and at least one of said inward openings of said chamber when said insert is positioned within said cavity.

* * * * *